(12) United States Patent
Matsumoto et al.

(10) Patent No.: US 9,914,487 B2
(45) Date of Patent: Mar. 13, 2018

(54) WORK VEHICLE

(71) Applicant: Kubota Corporation, Osaka-shi (JP)

(72) Inventors: Koichiro Matsumoto, Sakai (JP);
Nobuyuki Yamashita, Sakai (JP);
Hiroshi Kawabata, Sakai (JP);
Tomohisa Yamamoto, Sakai (JP);
Masayuki Akita, Sakai (JP); Tasuku Teraoka, Sakai (JP); Yoshihisa Tonoya, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/341,291

(22) Filed: Nov. 2, 2016

(65) Prior Publication Data

US 2017/0129543 A1  May 11, 2017

(30) Foreign Application Priority Data

Nov. 6, 2015  (JP) .................................. 2015-218787
Nov. 10, 2015 (JP) .................................. 2015-220557
Apr. 26, 2016 (JP) .................................. 2016-088380
Jun. 24, 2016 (JP) .................................. 2016-125878

(51) Int. Cl.
*B62D 25/10* (2006.01)
*B62D 25/12* (2006.01)
*B60R 19/44* (2006.01)
*B60R 19/52* (2006.01)

(52) U.S. Cl.
CPC .............. *B62D 25/12* (2013.01); *B60R 19/44* (2013.01); *B60R 19/52* (2013.01); *B60Y 2200/223* (2013.01)

(58) Field of Classification Search
CPC ........ B62D 25/10; B60R 19/52; B60R 19/565
See application file for complete search history.

(56) References Cited

U.S. PATENT DOCUMENTS

2009/0260909 A1* 10/2009 Oka .................... B62D 49/0671
                                                180/291
2016/0096426 A1*  4/2016 Kurokawa ............. B60K 13/04
                                                180/309

FOREIGN PATENT DOCUMENTS

JP        200535420 A    2/2005
JP        201070167 A    4/2010
JP       2011255695 A   12/2011

* cited by examiner

*Primary Examiner* — John Walters
*Assistant Examiner* — James Triggs
(74) *Attorney, Agent, or Firm* — The Webb Law Firm

(57) ABSTRACT

A work vehicle includes: a vehicle body frame; a prime mover part that is supported by the vehicle body frame; a bonnet that is configured to vertically swing between a closed position at which the prime mover part is covered, and an open position at which the prime mover part is open; and a support frame that supports a free end side of the bonnet located at the closed position. At least left and right guide-target parts of the bonnet or left and right guiding parts of the support frame have left and right inclined surfaces that serve as centering effective surfaces.

16 Claims, 19 Drawing Sheets

WORK VEHICLE

CROSS-REFERENCE TO RELATED APPLICATIONS

This application claims priority to Japanese Patent Application No. 2015-218787 filed Nov. 6, 2015, Japanese Patent Application No. 2015-220557 filed Nov. 10, 2015, Japanese Patent Application No. 2016-088380 filed Apr. 26, 2016, and Japanese Patent Application No. 2016-125878 filed Jun. 24, 2016, the disclosures of which are hereby incorporated in their entirety by reference.

BACKGROUND OF THE INVENTION

Field of the Invention

The present invention relates to a work vehicle.

Description of the Related Art

An example of a conventional work vehicle is disclosed in JP 2011-255695A. The work vehicle disclosed in this document is provided with: a prime mover part that is supported by a vehicle body frame; a bonnet that is capable of vertically swinging between a closed position at which the prime mover part is covered and an open position at which the prime mover part is open; and a support frame that supports a free end side of the bonnet located at the closed position.

In the work vehicle disclosed in the above-described document, when an operator or the like swings the bonnet downward from the open position toward the closed position, and the bonnet approaches the closed position, a round bar-shaped lock object provided on the bonnet side is guided toward an engagement recess of a fixing bracket attached to an engine mounting frame, by an inclined surface of the fixing bracket, thus realizing centering of the bonnet with respect to the vehicle body frame.

An example of a conventional work vehicle is disclosed in JP 2005-35420A. The work vehicle disclosed in this document is provided with a bonnet that includes a plurality of sheet metal members whose adjacent edges are welded together.

The work vehicle disclosed in the above-described document is provided with the bonnet that includes, as the plurality of sheet metal members, a roof member and lateral wall members, and the roof member and the lateral wall members have, as their adjacent edges, edge parts that extend to the inside of the bonnet. As a result of these edge parts being spot-welded in a state of being in surface contact with each other, a connected state of the roof member and the lateral wall members can be obtained.

An example of a conventional work vehicle is disclosed in JP 2010-70167A. The work vehicle disclosed in this document is provided with: a bonnet that is configured to open and close by swinging about a first pivot shaft that is located in the front end part of the vehicle body frame and is orientated in a left-right direction; and a front guard that is located immediately in front of the bonnet and protects the bonnet.

The work vehicle disclosed in the above-described document has a configuration in which a rotation pivot shaft is provided that serves as both the pivot of rotation of the bonnet and the pivot of rotation of the front guard, and a coupling member is interposed between the front guard and the bonnet so that the front guard is rotated to open and close in association with the bonnet being rotated to open and close.

In the above-described configuration of JP 2011-255695A, since centering of the bonnet with respect to the vehicle body frame is performed when the bonnet approaches the closed position, it is possible to prevent the bonnet from swinging laterally with respect to the vehicle body frame.

However, the centering is not performed when the bonnet is far from the closed position, and thus there is a risk that the bonnet will largely swing laterally with respect to the vehicle body frame when the bonnet is far from the closed position, causing a problem in which the bonnet comes into contact with the engine of the prime mover part or the like due to a large lateral swing of the bonnet.

In other words, it is demanded to avoid the risk of the bonnet coming into contact with the prime mover part in an operation of closing the bonnet.

In a work vehicle as disclosed in JP 2005-35420A above, coating for rust prevention or the like is performed on the roof member and the lateral wall members after the roof member is connected to the lateral wall members by spot-welding, but after the connection, a coating material is unlikely to enter between an edge part of the roof member and an edge part of the lateral wall members because the edge part of the roof member and the edge part of the lateral wall members are in surface contact with each other. Accordingly, there is likely to be an area that remains uncoated with the coating material between the edge part of the roof member and the edge part of the lateral wall members, and there is a risk that the external appearance quality will deteriorate due to the area uncoated with the coating material rusting.

In other words, it is demanded to prevent deterioration of the external appearance quality due to the area of the bonnet that is uncoated with the coating material rusting.

In the above-described configuration of JP 2010-70167A, swinging of the bonnet in the opening direction is not restricted by the front guard, and thus it is possible to largely swing the bonnet in the opening direction. Accordingly, when maintenance of the prime mover part or the like that is covered by the bonnet is to be performed, it is possible to use the swing operation of the bonnet in the opening direction to widely open an area around the prime mover part and the like that are covered by the bonnet. As a result, the maintainability of the prime mover part and the like is improved.

However, in the above-described configuration of JP 2010-70167A, the front guard is supported by a bracket fixedly mounted on an engine frame via the rotation pivot shaft. Accordingly, if the front guard collides with another object, the collision load at this time acts on the rotation pivot shaft. As a result, even if the front guard has a robust configuration, the collision of the front guard with another object will deform the rotation pivot shaft if the rotation pivot shaft has a low strength, which may cause a problem in which the front guard comes into contact with and damages the bonnet.

In other words, it is demanded that the bonnet is protected by the front guard more reliably without degrading the maintainability of the prime mover part and the like that are covered by the bonnet.

SUMMARY OF THE INVENTION

According to the present invention, a work vehicle includes:

a vehicle body frame;

a prime mover part that is supported by the vehicle body frame;

a bonnet that is configured to vertically swing between a closed position at which the prime mover part is covered, and an open position at which the prime mover part is open; and a support frame that supports a free end side of the bonnet located at the closed position;

wherein the bonnet is provided with, in free end parts of left and right inner side surfaces of the bonnet, left and right guide-target parts that are arranged in at least lower end portions of the free end parts, the support frame is provided with left and right guiding parts that are located at the same height as an upper end of the prime mover part, and are configured to come into contact with the left and right guide-target parts when the bonnet swings downward to the closed position, so as to enable the bonnet to be centered with respect to the vehicle body frame, and at least the left and right guide-target parts or the left and right guiding parts have left and right inclined surfaces that serve as centering effective surfaces.

According to the present invention, in an operation in which an operator or the like closes the bonnet from the open position to the closed position, if the bonnet laterally swings with respect to the vehicle body frame, and the lower end portions of the free end parts of the bonnet reach the positions at the height at which the upper end of the prime mover part is located, the left and right guide-target parts of the bonnet come into contact with the left and right guiding parts of the support frame. This contact effects centering of the bonnet with respect to the vehicle body frame.

In other words, with this means, in the operation of closing the bonnet, the centering of the bonnet with respect to the vehicle body frame is performed when the lower end portions of the free end parts of the bonnet reach the positions at the height at which the upper end of the prime mover part is located.

As a result, in the operation of closing the bonnet, it is possible to avoid a risk that the bonnet comes into contact with the prime mover part due to the bonnet laterally swinging with respect to the vehicle body frame.

In the above-described configuration, it is preferable that the bonnet is provided with, in the free end parts of the left and right inner side surfaces of the bonnet, left and right longitudinal members that have a vertical length that spans the lower end portions of the bonnet and an upper end side of the bonnet, the left and right longitudinal members are close to and run along left and right outer side surfaces of the support frame when the bonnet is located at the closed position, and the left and right guide-target parts respectively have the inclined surfaces that are inclined laterally outward of the vehicle body toward the free end side of the bonnet, and are provided in free end parts of the left and right longitudinal members.

According to the present configuration, in the operation of closing the bonnet, when the lower portions of the free ends of the left and right longitudinal members provided in the free end parts of the bonnet reach the positions at the height at which the upper side of the prime mover part is located, the left and right guide-target parts of the bonnet come into contact with the left and right guiding parts of the support frame. This contact effects centering of the bonnet with respect to the vehicle body frame.

Accordingly, when the bonnet is located at the closed position, gaps that are formed between the left and right longitudinal members of the bonnet and the left and right outer side surface of the support frame can be reduced uniformly in the vertical direction.

As a result, it is possible to effectively suppress the leakage of air with a raised temperature from the gaps between the left and right longitudinal members of the bonnet and the left and right outer side surface of the support frame.

In the above-described configuration, it is preferable that the bonnet is provided with, in the free end parts of the left and right inner side surfaces of the bonnet, left and right longitudinal members that have a vertical length that spans the lower end portions of the bonnet and an upper end side of the bonnet, the left and right longitudinal members are close to and run along left and right outer side surfaces of the support frame when the bonnet is located at the closed position, and the left and right guide-target parts respectively have the inclined surfaces that are inclined laterally outward of the vehicle body toward a lower end side of the bonnet, and are provided in lower end parts of the left and right longitudinal members.

According to the present configuration, in the operation of closing the bonnet, when the lower end parts of the left and right longitudinal members provided in the free end parts of the bonnet reach the positions at the height at which the upper end of the prime mover part is located, the left and right guide-target parts of the bonnet come into contact with the left and right guiding parts of the support frame. This contact effects centering of the bonnet with respect to the vehicle body frame.

Accordingly, when the bonnet is located at the closed position, gaps that are formed between the left and right longitudinal members of the bonnet and the left and right outer side surface of the support frame can be reduced uniformly in the vertical direction.

As a result, it is possible to effectively suppress the leakage of air with a raised temperature from the gaps between the left and right longitudinal members of the bonnet and the left and right outer side surface of the support frame.

In the above-described configuration, it is preferable that the left and right guide-target parts are detachably attached to the left and right longitudinal members.

According to the present configuration, if the left and right guide-target parts have worn due to the centering of the bonnet, the operator can easily replace the worn member with a new guide-target part.

In other words, the maintainability regarding the centering of the bonnet is improved.

In the above-described configuration, it is preferable that the left and right guide-target parts are respectively provided with first members that are configured to be attached to and detached from the left and right longitudinal members, and second members that are configured to be attached to and detached from the first members, and the left and right second members are made of smooth resin, and have the inclined surfaces.

According to the present configuration, in the centering of the bonnet, the friction resistance that occurs between the left and right guiding parts and the left and right guide-target parts is reduced.

Furthermore, it is possible to prevent coating of the guide parts and the guide-target parts that are both made from coated metal from being removed by the centering, for example.

If the left and right second member have worn due to the centering of the bonnet, the operator can easily replace the worn second member with a new second member.

As a result, it is possible to improve the maintainability regarding the centering of the bonnet, while achieving more smooth centering of the bonnet with respect to the vehicle body frame.

According to the present invention, a work vehicle includes:

a bonnet including a plurality of sheet metal members that have adjacent edges that are welded to each other, wherein the plurality of sheet metal members extend toward the inside of the bonnet so that the adjacent edges have adjacent surfaces that face each other, and extension ends of the adjacent edges are welded to each other so that the adjacent edges are arranged at a predetermined gap between the adjacent surfaces that face each other.

According to the present invention, the plurality of sheet metal members are such that, in a connected state in which adjacent edges thereof are welded to each other, a predetermined gap between adjacent surfaces that face each other is ensured over the entire length of the adjacent edges.

Thus, when the connected plurality of sheet metal members are subjected to coating, a coating material spreads over the entirety of the surfaces of the sheet metal members, and enters the entire area of the gap ensured between the adjacent surfaces that face each other.

As a result, no area between the adjacent edges of the plurality of sheet metal members remains uncoated with the coating material, and thus it is possible to prevent deterioration of the external appearance quality due to the area uncoated with the coating material rusting.

Furthermore, the welding for connecting the plurality of sheet metal members can be performed, on the extension ends of the edges that extend toward the inside of the bonnet, from the downstream side in the extending direction. Thus, it is easier to weld the adjacent edges than the case where, for example, opposing positions of the adjacent edges are sandwiched and welded to each other in the direction in which they are adjacent to each other.

As a result, it is possible to improve the operation efficiency in the welding operation to connect the plurality of sheet metal members.

In the above-described configuration, it is preferable that the bonnet has coated surfaces that are obtained by coating surfaces of the sheet metal members, and a coated surface that is obtained by coating the gap, the coated surfaces being even to form an even coated surface.

With this configuration, when the connected plurality of sheet metal members are subjected to coating, not only the coating material spreads over the entirety of the surfaces of the sheet metal members, and enters the entire area of the gap ensured between the adjacent surfaces that face each other, but also the coated surfaces in the surface regions of the sheet metal members, and the coated surfaces in the gap region that are formed by the coating material inserted into and accumulated in the gap between the adjacent surfaces become even.

As a result, the bonnet can have an aesthetically pleasing external appearance in which there is no difference in level between the coated surfaces in the surface regions of the sheet metal members, and the coated surfaces in the gap region between the sheet metal members.

According to the present invention, a work vehicle includes:

a vehicle body frame;

a bonnet that is configured to open and close by swinging about a first pivot shaft that is located in a front end part of the vehicle body frame, and is orientated in a left-right direction; and a front guard that is located immediately in front of the bonnet, and protects the bonnet, wherein the front guard is provided with left and right first guard members whose lower end parts are fixed and coupled to the vehicle body frame, and a second guard member that is located between the left and right first guard members, the left and right first guard members have a left-right distance that is larger than a left-right width of the bonnet, and allow the bonnet to be inserted into a space between the left and right first guard members, the second guard member is configured to swing in a front-rear direction about a second pivot shaft that is located in the front end part of the vehicle body frame and is orientated in the left-right direction, between a guard position at which the second guard member is located immediately in front of the bonnet at the closed position, and a retracted position at which the second guard member allows the bonnet to swing to the open position, and front end parts of the left and right first guard members are located further forward of a vehicle body than a front end part of the second guard member located at the guard position is.

According to the present invention, when performing maintenance on the prime mover part or the like that is covered by the bonnet, the operator first operates the second guard member so as to swing from the guard position to the retracted position, and then performs an operation to open the bonnet. Thus, it is possible to widely swing the bonnet in the opening direction without being restricted by the front guard. Therefore, it is possible to widely open an area around the prime mover part that is covered by the bonnet, and it is easier to perform maintenance on the prime mover part.

When the operator drives the work vehicle, the bonnet is closed and the second guard member is located at the guard position. Therefore, if the front guard collides with another object, usually the front end parts of the left and right first guard members, which are fixed and coupled to the vehicle body frame and have a high supporting strength, collide with the other object. Therefore, it is possible to effectively prevent a problem in which the front guard that has collided with another object comes into contact with the bonnet.

Furthermore, when the front guard collides with another object, the object may enter the gap between the left and right first guard members. In such a case, the second guard member collides with the other object and protects the bonnet.

As a result, it is possible to reliably protect the bonnet by using the front guard without degrading the maintainability of the prime mover part and the like that are covered by the bonnet.

In the above-described configuration, it is preferable that the front end parts of the left and right first guard members are located in the vicinity of the lower end parts.

According to the present configuration, in each of the left and right first guard members, a distance between the lower end part that is fixed and coupled to the vehicle body frame, and the front end part that collides with another object is small. It is thus possible to reduce the moment that acts on the left and right first guard members when the front end parts of the left and right first guard members collide with the another object.

As a result, it is possible to more effectively prevent a problem in which, when the front end parts of the left and right first guard members collide with another object, the left and right first guard members are deformed and come into contact with the bonnet. It is thus possible to reliably protect the bonnet by using the left and right first guard members.

In the above-described configuration, it is preferable that the left and right first guard members each have a lower-side first bent part and an upper-side second bent part that are bent along fold lines that are orientated in the front-rear direction, the left and right first guard members are formed so as to have a left-right distance on a lower end part side that is smaller than a left-right distance on an upper part side allowing the bonnet to be inserted into a space between the left and right first guard members on the upper part side, and the left and right first guard members respectively have the front end parts that are formed in the first bent parts or portions adjacent to the first bent parts.

According to the present configuration, it is possible to improve the strength of the front end parts of the left and right first guard members. Also, if the front guard collides with another object, it is possible to prevent the object from entering the space between the left and right first guard members.

As a result, it is possible to protect the bonnet by using the left and right first guard members more reliably and appropriately.

In the above-described configuration, it is preferable that the front guard is provided with a coupling member that has a left-right width that spans the lower end parts of the left and right first guard members, and couples the lower end parts of the left and right first guard members, and the coupling member is joined to a front end surface of the vehicle body frame.

According to the present configuration, it is possible to improve the strength and the shape retainability of the lower end parts of the left and right first guard members. Also, when the front guard collides with another object, it is possible to disperse the collision load over the front end surface of the vehicle body frame, and it is possible to prevent stress from concentrating at the position where the lower end parts of the left and right first guard members and the vehicle body frame are coupled to each other.

As a result, it is possible to more reliably protect the bonnet by using the left and right first guard members, while improving the durability of the front guard.

In the above-described configuration, it is preferable that the front guard is provided with a coupling mechanism that couples the second guard member at the guard position to either or both of the left and right first guard members.

According to the present configuration, it is possible to improve the supporting strength of the second guard member at the guard position. Also, if the front guard collides with another object and the object enters the space between the left and right first guard members, the second guard member having improved strength collides with the other object.

As a result, it is possible to effectively prevent a problem in which the second guard member swings rearward from the guard position due to the collision with the other object, and comes into contact with the bonnet, and it is possible to more reliably protect the bonnet by using the second guard member.

In the above-described configuration, it is preferable that the second guard member has a longitudinal wall part that faces a front face of the bonnet, and the longitudinal wall part has a bent part that is bent along a fold line that is orientated in the left-right direction.

According to the present configuration, it is possible to improve the strength of the longitudinal wall part of the second guard member. If the front guard collides with another object and the object enters the space between the left and right first guard members, the longitudinal wall part having improved strength collides with the other object.

As a result, it is possible to effectively prevent a problem in which the second guard member is deformed due to the collision with the other object and comes into contact with the bonnet, and it is possible to more reliably protect the bonnet by using the second guard member.

In the above-described configuration, it is preferable that the second guard member is U-shaped when viewed in plan view, and includes a longitudinal wall part that faces a front face of the bonnet, and left and right extension parts that extend rearward from left and right ends of the longitudinal wall part.

According to the present configuration, it is possible to improve the strength of the longitudinal wall part of the second guard member. Also, if the front guard collides with another object and the object enters the space between the left and right first guard members, the second guard member having improved strength collides with the other object.

As a result, it is possible to effectively prevent a problem in which the second guard member is deformed due to the collision with the other object and comes into contact with the bonnet, and it is possible to more reliably protect the bonnet by using the second guard member.

BRIEF DESCRIPTION OF THE DRAWINGS

FIG. 11 shows the second example of the first embodiment, and is a perspective view of the main part, illustrating configurations of left and right longitudinal members, the left and right guide-target parts, and the like.

FIG. 19 shows the second embodiment, and is a perspective view of the main part, illustrating configurations of the bonnet and the like.

DETAILED DESCRIPTION OF THE PREFERRED EMBODIMENTS

First Embodiment

First Example

The following describes, as an example of a mode for carrying out the present invention, a first example in which the present invention is applied to a tractor that is an example of a work vehicle with reference to the drawings.

Figure 1:
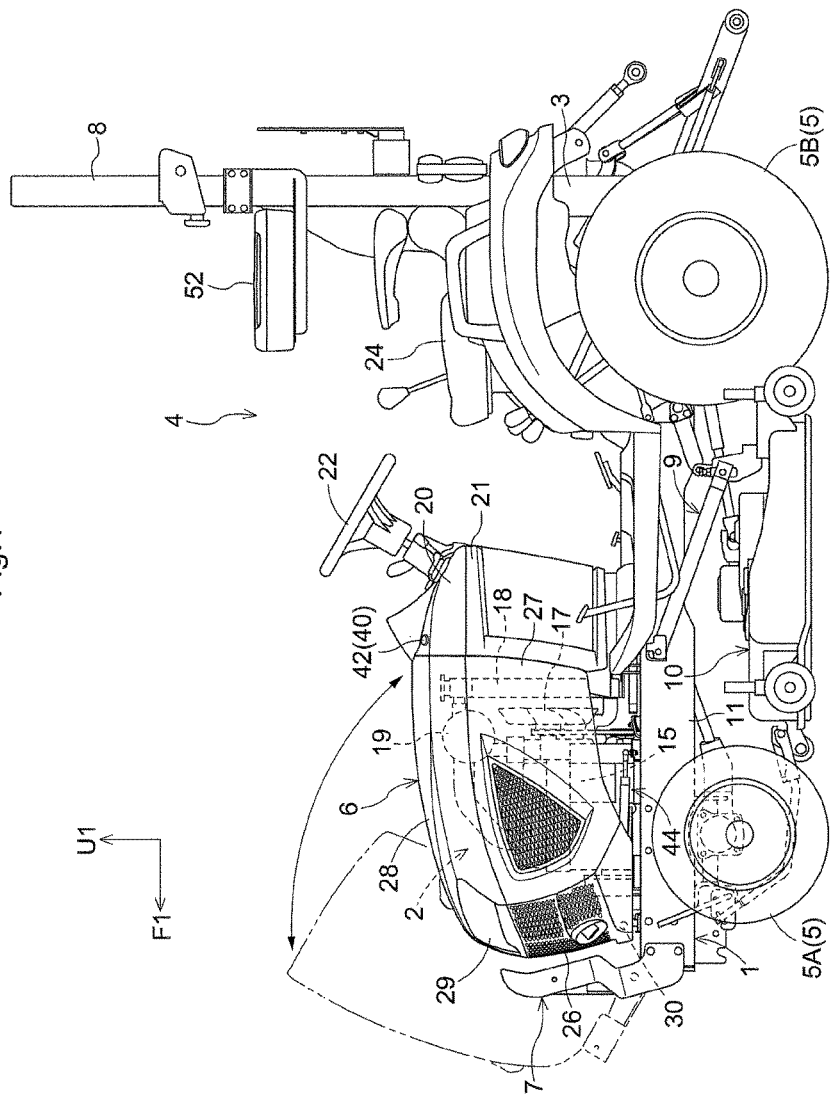
FIG. 1 shows a first embodiment, and is a left-side view of a tractor.

Note that the direction indicated by a sign F1 shown in FIG. 1 is the forward direction of the tractor, and the direction indicated by a sign U1 is the upward direction of the tractor.

Figure 2:
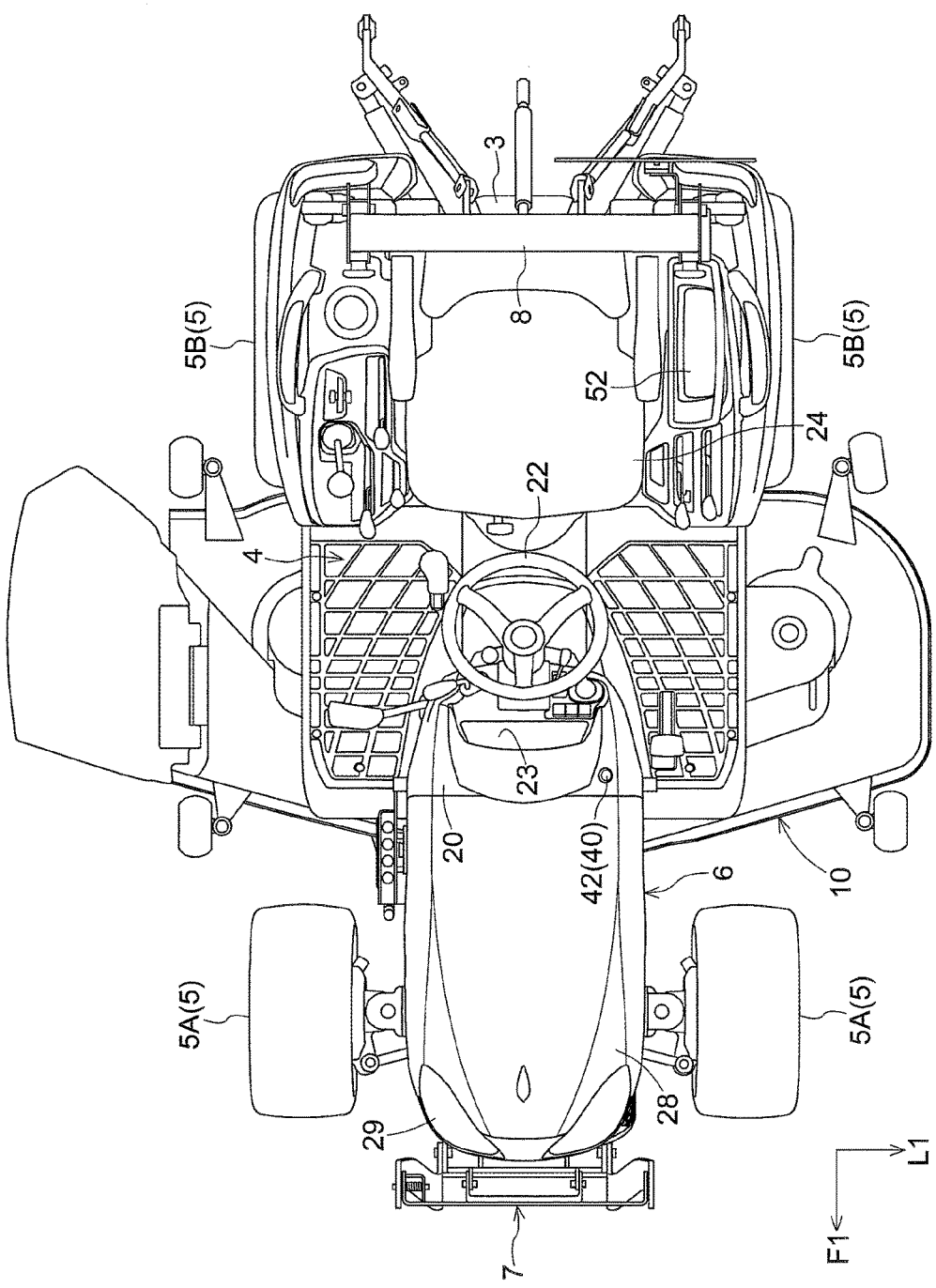
FIG. 2 shows the first embodiment, and is a plan view of the tractor.

The direction indicated by the sign F1 shown in FIG. 2 is the forward direction of the tractor, and the direction indicated by a sign L1 is the leftward direction of the tractor.

As shown in FIGS. 1 and 2, the tractor described in the present first example as an example is provided with, for example: a vehicle body frame 1 that constitutes the framework of a vehicle body; a prime mover part 2 that is supported on the front part side of the vehicle body frame 1; a transmission unit 3 that is coupled to a rear part of the vehicle body frame 1; a driving part 4 of a boarding type that is located above the rear part of the vehicle body frame 1; left and right traveling devices 5; a bonnet 6 that covers the prime mover part 2 and is configured to open and close by swinging; a front guard 7 that is made from a steel plate, and is located immediately in front of the bonnet 6 to protect the bonnet 6 and the like; a protection frame 8 that is coupled to the rear end part of the vehicle body frame 1; and a mower 10 that is coupled to the vehicle body frame 1 via a link mechanism 9 so as to be able to be lifted and lowered. Furthermore, the tractor has a configuration of a four-wheel-driving type as a result of being provided with, as the left and right traveling devices 5, left and right front wheels 5A that are steerable and are driven by a driving force from the prime mover part 2, and left and right rear wheels 5B that are steerable and are driven by a driving force from the prime mover part 2. Furthermore, the tractor has a configuration of a mid-mount type as a result of being provided with the mower 10 located on an underbody between the left and right front wheels 5A and the left and right rear wheels 5B.

Figure 3:
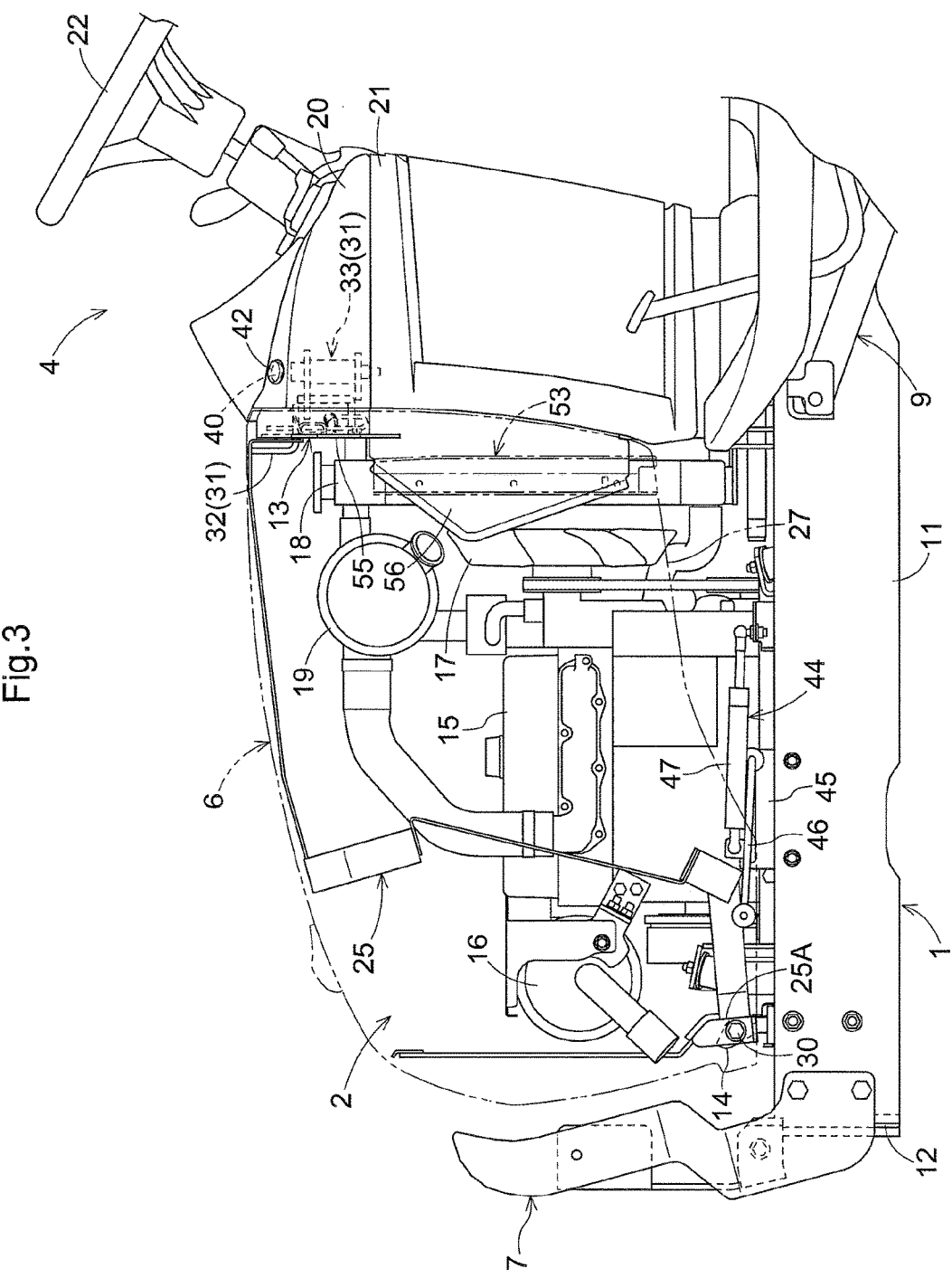
FIG. 3 shows a first example of the first embodiment, and is a longitudinal left-side view of a main part, illustrating a state in which a bonnet is located at a closed position.
Figure 4:
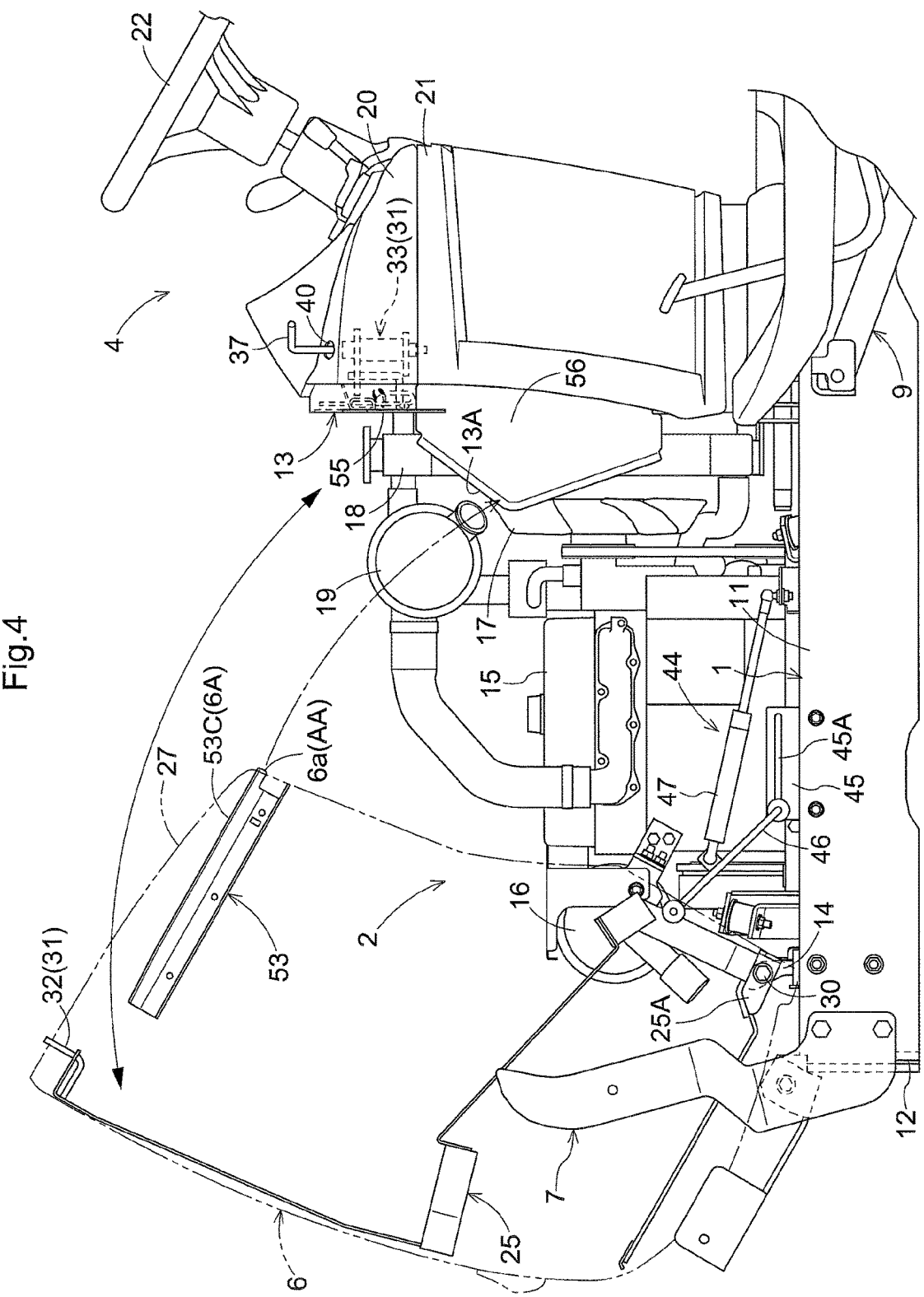
FIG. 4 shows the first example of the first embodiment, and is a longitudinal left-side view of the main part, illustrating a state in which the bonnet is located at an open position.

As shown in FIGS. 1, 3, and 4, the vehicle body frame 1 is provided with, for example: left and right side members 11 that are made from steel plates and are elongated in the front-rear direction; a front end member 12 that is made from a steel plate and spans the front ends of the left and right side members 11; a center pillar 13 that is coupled to central parts, in the front-rear direction, of the left and right side members 11; and left and right bonnet-coupling brackets 14 that are coupled to front end parts of the left and right side members 11.

As shown in FIGS. 1 to 4, the prime mover part 2 is provided with, for example: a water-cooled type engine 15 that is supported by the front part of the vehicle body frame 1 so as to be vibration-proof; a muffler 16 that is arranged in front of the engine 15 and is orientated in the left-right direction; a cooling fan 17 that is arranged behind the engine 15; a radiator 18 that is arranged behind the cooling fan 17; and an air cleaner 19 that is arranged above the engine 15. In the prime mover part 2, the front part side is covered by the bonnet 6, the upper part side of the rear end part is covered by an upper panel 20, and the lower part side of the rear end part is covered by an under panel 21.

The driving part 4 is provided with, for example: a steering wheel 22 for steering the front wheels; a display panel 23 that displays, for example, the number of revolutions of the engine; and an operation seat 24 that is arranged above the transmission unit 3.

As shown in FIGS. 1 to 5, the bonnet 6 is an integrated member in which, for example: a bonnet frame 25 that is made from a steel plate and constitutes the framework of the bonnet 6; a front cover 26 that covers the front end part of the prime mover part 2; left and right side covers 27 that cover lateral side parts of the prime mover part 2; an upper cover 28 that covers the upper part of the prime mover part 2; and a headlight unit 29 are coupled integrally with each other. The bonnet 6 opens and closes by swinging in the vertical direction about pivot shafts 30 that are located in the front end part of the vehicle body frame 1 and are orientated in the left-right direction. A lower end portion of the front end part of the bonnet frame 25 is provided with left and right coupling parts 25A. The left and right coupling parts 25A are coupled to the left and right brackets 14 of the vehicle body frame 1 with left and right bolts 30 that serve as the pivot shafts 30 orientated in the left-right direction being interposed therebetween.

With the above-described configuration, the bonnet 6 is configured as a rear-open type bonnet that is capable of vertically swinging between a closed position at which the prime mover part 2 is covered, and an open position at which the prime mover part 2 is open, and that widely opens the rear part side of the prime mover part 2 when located at the open position. As a result, it is easier to perform maintenance on the radiator 18, the air cleaner 19, and the like that are arranged on the rear part side of the prime mover part 2.

As shown in FIGS. 3 and 4, this tractor is provided with a lock mechanism 31 that fixes and holds the bonnet 6 at the closed position located downward. The lock mechanism 31 is provided with, for example: an L-shaped fixing rod 32 that is fixed and mounted to the bonnet frame 25 of the bonnet 6; and a lock unit 33 that is arranged in an upper end part of the center pillar 13.

Although not shown, the lock unit 33 is provided with, for example: a hook member that is provided on the center pillar 13 so as to be able to swing between a lock position and an unlock position; and an extension spring that biases the hook member such that the hook member returns to the lock position. The hook member is provided with a cam part that allows, when being pressed by the fixing rod 32 from the above, the hook member to swing to retract to the unlock position against the action of the extension spring.

With the above-described configuration, when an operator such as a driver operates the bonnet 6 so as to swing to the closed position, the fixing rod 32 on the bonnet side presses the cam part of the hook member from the above. Accordingly, due to this pressing, the hook member swings to retract from the lock position to the unlock position against the action of the extension spring. Thereafter, as the bonnet 6 approaches the closed position, the fixing rod 32 moves to a position below the cam part, and together with the movement, the hook member returns to the lock position due to the action of the extension spring, and catches on the fixing rod 32.

In other words, a user (operator) such as a driver can fix and hold the bonnet 6 at the closed position using the action of the lock mechanism 31 with a simple operation to operate the bonnet 6 to swing to the closed position.

As shown in FIG. 4, the lock mechanism 31 is provided with a detachable operation rod 37 that enables the hook member to swing to the unlock position against the action of the extension spring by being inserted into a through hole 40 formed in the left-side front end part of the upper panel 20.

Accordingly, when releasing the bonnet 6 from the closed position at which it is fixed and held, the operator can insert the operation rod 37 into the through hole 40 of the upper panel 20 such that the hook member swings to retract to the unlock position against the action of the extension spring.

In other words, the operator can easily release the bonnet 6 from the closed position at which it is fixed and held by the lock mechanism 31, using the operation rod 37.

As shown in FIGS. 1 to 3, a rubber cap 42 that closes the through hole 40 is detachably attached to the upper panel 20. In other words, it is possible to release the bonnet 6 from the closed position at which it is fixed and held by the lock mechanism 31, by removing the cap 42 from the upper panel 20.

As shown in FIGS. 1 and 2, a tool box 52 is attached to the frame part on the left side of the protection frame 8. Accordingly, it is possible to store the operation rod 37 of the lock mechanism 31 in the tool box 52 when driving.

As shown in FIGS. 1, 3, and 4, this tractor is provided with an assist unit 44 that assists an operation to open the bonnet 6. The assist unit 44 is provided with, for example: a guide member 45 that has a guide hole 45A orientated in the front-rear direction, and is fixed to the vehicle body frame 1; a linkage rod 46 that spans the guide member 45 and the bonnet frame 25; and a gas spring 47 that spans the linkage rod 46 and the vehicle body frame 1. The assist unit 44 is configured to assist an operation to open the bonnet 6 by using the extending action of the gas spring 47.

With the above-described configuration, due to the action of the assist unit 44, the operator can easily open and close the heavy bonnet 6 into which the front cover 26, the left and right side covers 27, and the like are integrated, and that opens and closes by swinging.

Figure 5:
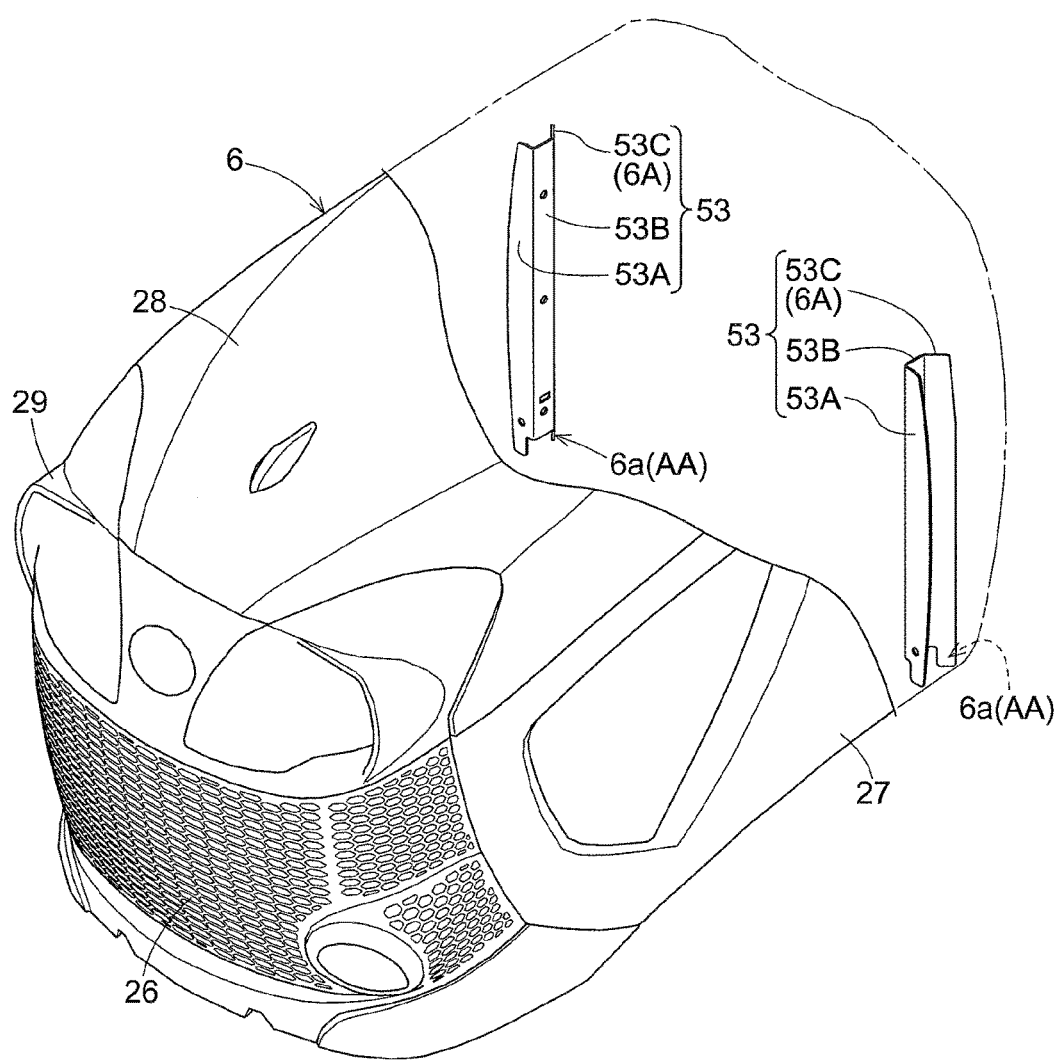
FIG. 5 shows the first example of the first embodiment, and is a partially cut-out perspective view illustrating the configuration of the bonnet.
Figure 6:
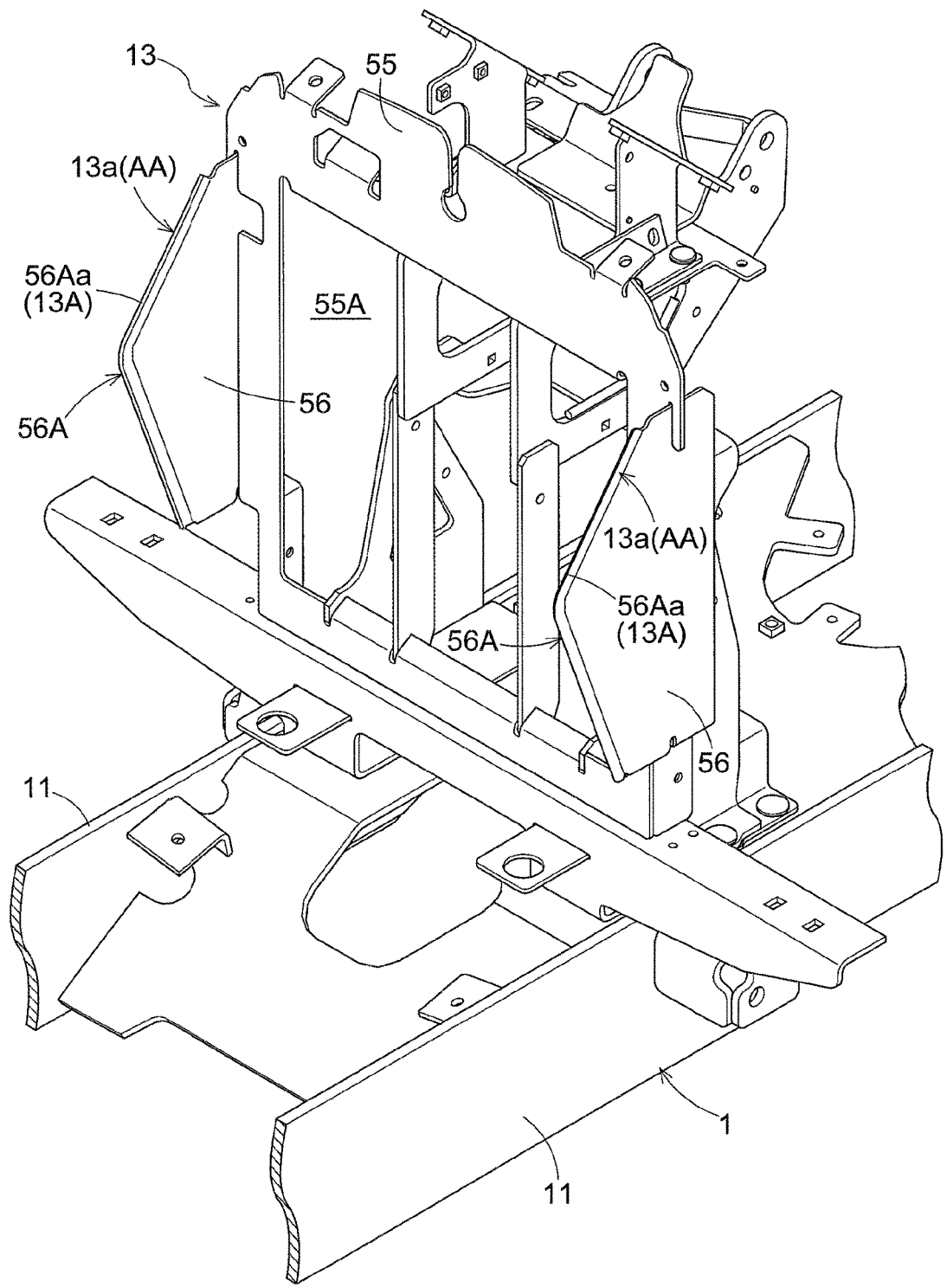
FIG. 6 shows the first embodiment, and is a perspective view of the main part illustrating a configuration of a support frame.

As shown in FIGS. 3 to 5, the left and right longitudinal members 53 that have a vertical length that spans the lower end portions and the upper end portions of the side covers 27 are coupled to free end parts on the inner side surfaces of the left and right side covers 27, which are left and right inner side surfaces of the bonnet 6.

Accordingly, it is possible to reinforce the free end parts of the left and right side covers 27, and reinforce the free end parts of the bonnet 6.

Figure 7:
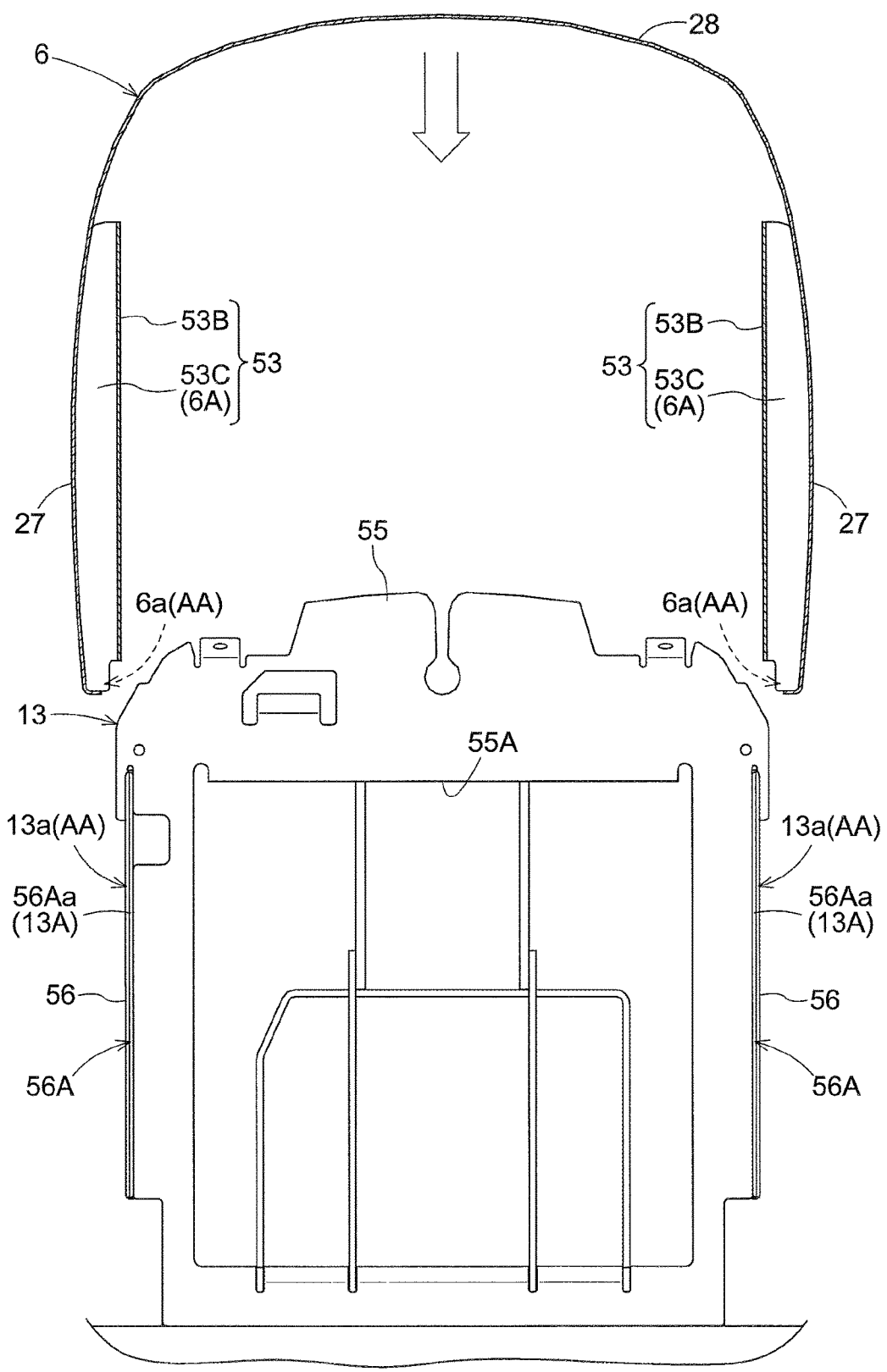
FIG. 7 shows the first example of the first embodiment, and is a longitudinal front view of the main part, illustrating a positional relationship between left and right guiding parts and left and right guide-target parts when the bonnet is located at the open position.
Figure 8:
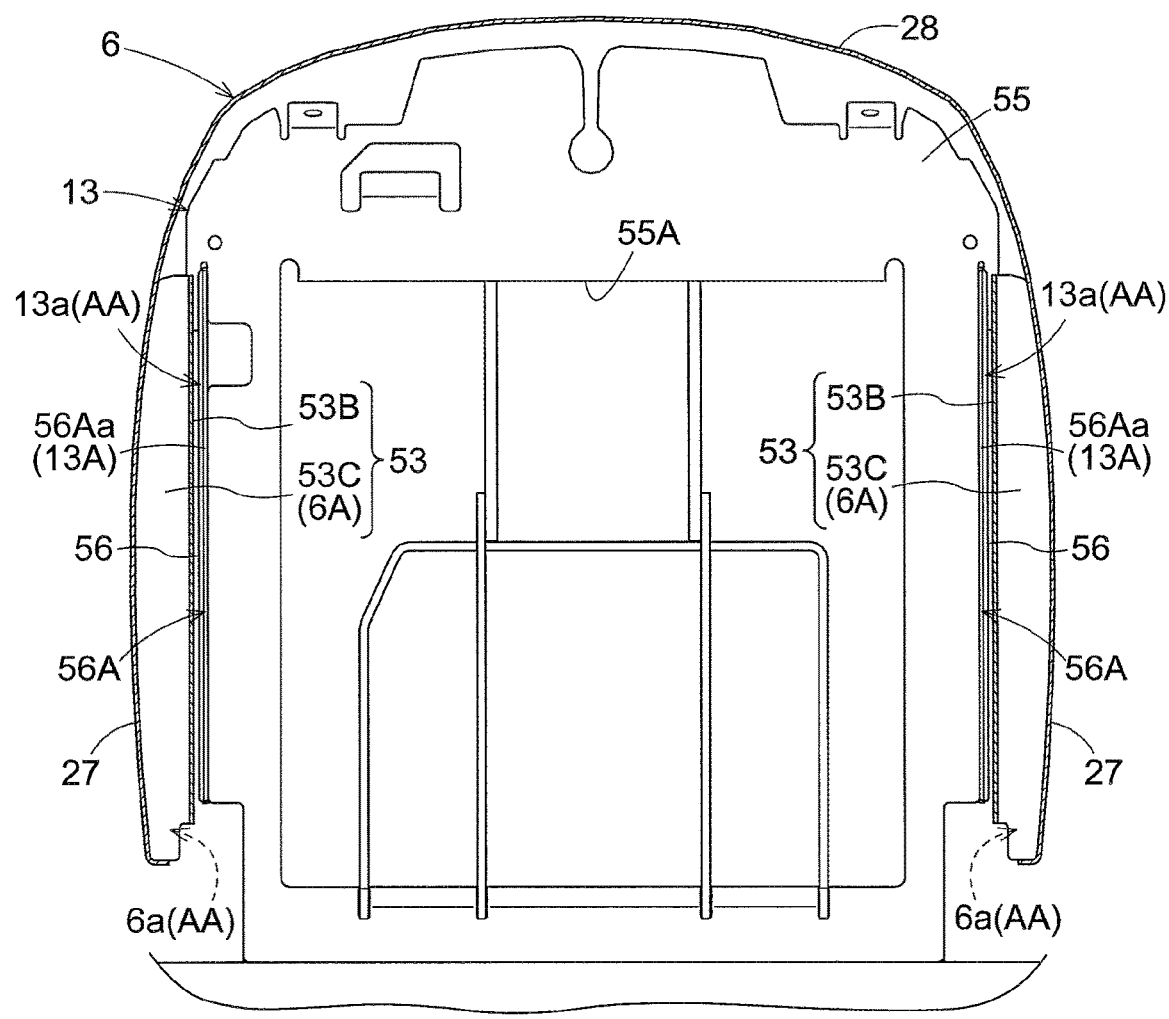
FIG. 8 shows the first example of the first embodiment, and is a longitudinal front view of the main part, illustrating a positional relationship between the left and right guiding parts and the left and right guide-target parts when the bonnet is located at the closed position.
Figure 9:
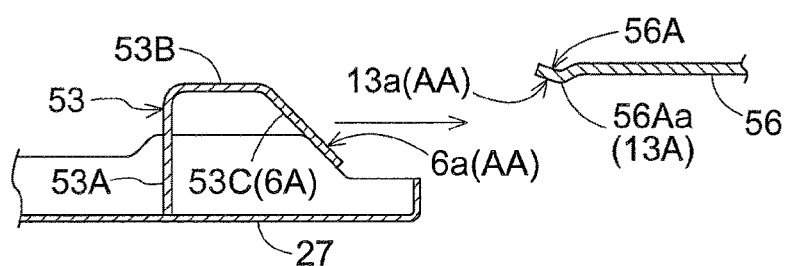
FIG. 9 shows the first example of the first embodiment, and is a transverse plan view of the main part, illustrating the positional relationship between the left and right guiding parts and the left and right guide-target parts when the bonnet is located at the open position.

As shown in FIGS. 5, 7, and 8, the left and right longitudinal members 53 are made from steel plates, and are subjected to coating processing. The left and right longitudinal members 53 are substantially U-shaped in plan view, and are each provided with, for example: a first front wall part 53A that extends from the inner side surface of the side cover 27 toward the central side, in the left-right direction, of the vehicle body; a side-wall part 53B that extends rearward from the extension end of the first front wall part 53A; and a rear wall part 53C that extends from the rear end of the side-wall part 53B toward the side cover 27.

As shown in FIGS. 3, 4, and 6 to 8, the center pillar 13 is provided with, for example: a support member 54 that spans the left and right side members 11; a partition wall 55 whose lower end part is supported by the support member 54; and left and right side walls 56 that are coupled to both left and right end parts of the partition wall 55. Thus, the center pillar 13 is configured to have a high strength. The partition wall 55 has the shape of a substantially rectangular frame having a radiator ventilating opening 55A in the center, and has a left-right width larger than a left-right width of the prime mover part 2. The left and right side walls 56 are arranged in both left and right end parts of the partition wall 55 at a left-right distance larger than the left-right width of the prime mover part 2.

As shown in FIGS. 3 and 4, the upper end part of the partition wall 55 of the center pillar 13 is used also as a support part that receives and supports the free end part of the bonnet 6 located at the closed position via the upper panel 20. In other words, the center pillar 13 functions as a support frame that supports the free end side of the bonnet 6 located at the closed position.

As shown in FIGS. 5 to 9, the bonnet 6 is provided with left and right guide-target parts 6A that are arranged in the free end parts on the inner side surfaces of the left and right side covers 27. The center pillar 13 is provided with left and right guiding parts 13A that are located at the same height as the upper end of the prime mover part 2, and come into contact with the left and right guide-target parts 6A when the bonnet 6 swings downward to the closed position, so as to enable centering of the bonnet 6 with respect to the vehicle body frame 1.

The left and right guide-target parts 6A are respectively constituted by the rear wall parts 53C which serves as the free end parts of the left and right longitudinal members 53. The left and right rear wall parts 53C are provided on the left and right longitudinal members 53 while being inclined rearward of the vehicle body and laterally outward of the vehicle body. Accordingly, the left and right guide-target parts 6A include inclined surfaces 6a that are inclined laterally outward of the vehicle body toward the free end side of the bonnet 6. The left and right inclined surfaces 6a function as centering effective surfaces AA that come into contact with the left and right guiding parts 13A so as to enable centering of the bonnet 6.

The left and right guiding parts 13A are provided on the left and right side walls 56 of the center pillar 13. The left and right side walls 56 have front edges 56A that are sideward-V-shaped due to the front part side thereof being tapered. Accordingly, tapered upper-side front edge parts 56Aa, on the front end side, of the left and right front edges 56A function as the guiding parts 13A.

With the above-described configuration, in an operation in which the operator closes the bonnet 6 from the open position to the closed position, if the bonnet 6 laterally swings with respect to the vehicle body frame 1, and the lower portions of the free end parts of the left and right longitudinal members 53 provided in the free end parts of the bonnet 6 reach the positions at the height at which the upper end of the prime mover part 2 is located, the left and right guide-target parts 6A of the bonnet 6 come into contact with the left and right guiding parts 13A of the center pillar 13. This contact effects centering of the bonnet 6 with respect to the vehicle body frame 1.

As a result, in the operation of closing the bonnet 6, it is possible to avoid the risk of the bonnet 6 coming into contact with the engine 15 of the prime mover part 2 or the like due to a lateral swing of the bonnet 6 with respect to vehicle body frame 1.

Furthermore, it is possible to simplify the configuration compared to a case where a dedicated member having the guiding parts 13A is provided.

As shown in FIG. 8, the left and right longitudinal members 53 are provided on the bonnet 6 so that, when the bonnet 6 is located at the closed position, the left and right side-wall parts 53B are close to and run along outer side surfaces of the left and right side walls 56 of the center pillar 13.

Accordingly, when the bonnet 6 is located at the closed position, gaps that are formed between the left and right longitudinal members 53 of the bonnet 6 and the outer side surfaces of the left and right side walls 56 of the center pillar 13 can be reduced uniformly in the vertical direction.

As a result, it is possible to effectively suppress the leakage of air with a raised temperature from the gaps between the left and right longitudinal members 53 of the bonnet 6 and the left and right side walls 56 of the center pillar 13.

As shown in FIGS. 6 to 9, the front edges 56A of the left and right side walls 56 of the center pillar 13 have a cross section that is tapered laterally outward, and are bent while protruding laterally outward of the vehicle body from the left and right side walls 56. Accordingly, the center pillar 13 has, on the front end side of the left and right upper-side front edge parts 56Aa that serve as the left and right guiding parts 13A, inclined surfaces 13a that are inclined laterally outward of the vehicle body toward the lower end side. Also, the left and right inclined surfaces 13a function as the centering effective surfaces AA that come into contact with the left and right guide-target parts 6A so as to enable the centering of the bonnet 6.

In other words, in this first example, the left and right guide-target parts 6A of the bonnet 6, and the left and right guiding parts 13A of the center pillar 13 respectively have the left and right inclined surfaces 6a and 13a that function as the centering effective surfaces AA, and thus it is possible to reduce the friction resistance that occurs between the left and right guiding parts 13A and the left and right guide-target parts 6A in the centering of the bonnet 6.

As a result, the centering of the bonnet 6 with respect to the vehicle body frame 1 can be performed more smoothly, and thus the operation of closing the bonnet 6 can be performed more smoothly.

Second Example

The following describes, as an example of a mode for carrying out the present invention, a second example in which the present invention is applied to a tractor serving as an example of a work vehicle with reference to the drawings.

Note that this second example differs from the above-described first example only in that the left and right guide-target parts 6A provided on the bonnet 6 have a different configuration, and thus only the configuration of the left and right guide-target parts 6A will be described.

As shown in FIGS. 10 to 13, the bonnet 6 is provided with, in the free end parts on their left and right inner side surfaces, the left and right longitudinal members 53 that have a vertical length that spans the lower end portions of the bonnet 6 and the upper end side thereof. When the bonnet 6 is at the closed position, the left and right longitudinal members 53 are close to and run along the outer side surfaces of the left and right side walls 56 of the center pillar (an example of the support frame) 13. The left and right longitudinal members 53 are provided with guide-target parts 6A in the lower end portions thereof. The left and right guide-target parts 6A have inclined surfaces 6b that are inclined laterally outward of the vehicle body toward the lower end side of the bonnet 6. The left and right inclined surfaces 6b function as the centering effective surfaces AA that come into contact with the left and right guiding parts 13A of the center pillar 13 so as to enable the centering of the bonnet 6.

With the above-described configuration, in an operation in which the operator closes the bonnet 6 from the open position to the closed position, if the bonnet 6 laterally swings with respect to the vehicle body frame 1, and the lower end parts of the left and right longitudinal members 53 reach the positions at the height at which the upper end of the prime mover part 2 is located, the left and right guide-target parts 6A come into contact with the left and right guiding parts 13A. This contact effects the centering of the bonnet 6 with respect to the vehicle body frame 1.

As a result, in the operation of closing the bonnet 6, it is possible to avoid the risk of the bonnet 6 coming into contact with the engine 15 of the prime mover part 2 or the like due to a lateral swing of the bonnet 6 with respect to vehicle body frame 1.

Accordingly, when the bonnet 6 is located at the closed position, gaps that are formed between the left and right longitudinal members 53 and the left and right side walls 56 can be reduced uniformly in the vertical direction.

As a result, it is possible to effectively suppress the leakage of air with a raised temperature from the gaps between the left and right longitudinal members 53 of the bonnet 6 and the left and right outer side surfaces of the center pillar 13.

The left and right guide-target parts 6A are provided with: first members 61 that are detachable to and from the left and right longitudinal members 53; and second members 62 that are detachable to and from the left and right first members 61. The left and right second members 62 respectively have the above-described inclined surfaces 6b made of smooth resin.

The above-described configuration reduces the friction resistance occurring between the left and right guiding parts 13A and the left and right guide-target parts 6A in the centering of the bonnet 6.

Furthermore, when, for example, the lower end parts of the left and right longitudinal members 53 that are made from steel plates and are subjected to coating processing are used as the left and right guide-target parts 6A, it is possible to prevent the coating from being removed as a result of the centering.

If the left and right second members 62 have worn due to the centering of the bonnet 6, the operator can easily replace the worn member 62 with a new second member 62.

As a result, it is possible to improve the maintainability regarding the centering of the bonnet 6 while ensuring smooth centering of the bonnet 6 with respect to the vehicle body frame 1.

A resin that is relatively hard, slides easily, and is abrasion-proof such as ABS resin is preferably used for the left and right second members 62.

The first front wall parts 53A (first front wall parts 53A of the first example) of the left and right longitudinal members 53 each have, in the lower part thereof, a female thread part 53D for bolt-coupling. The first side-wall parts 53B (side-wall parts 53B of the first example) each have, in the lower part thereof, a first through hole 53E for engagement. The left and right first members 61 are each provided with, for example: a second front wall part 61A that is in surface contact with the first front wall part 53A; a second side-wall part 61B that is in surface contact with the first side-wall part 53B; and a support part 61C that supports the second member 62. The second front wall parts 61A of the left and right first members 61 each have a second through hole 61D for bolt-coupling. The second side-wall part 61B has, in the upper end part thereof, a first projection 61E for engagement that is inserted into the first through hole 53E.

With the above-described configuration, when attaching the left and right first members 61 to the left and right longitudinal members 53, the operator inserts the first projections 61E into the first through holes 53E, and then couples the second front wall parts 61A to the first front wall parts 53A with bolts using the second through holes 61D and the female thread parts 53D. Accordingly, it is possible to easily attach the left and right first members 61 to the lower end parts of the left and right longitudinal members 53 in a state in which the second front wall parts 61A are in surface contact with the first front wall parts 53A, and the second side-wall parts 61B are in surface contact with the first side-wall parts 53B.

Furthermore, when detaching the left and right first members 61 from the left and right longitudinal members 53, the operator releases the coupling of the second front wall parts 61A to the first front wall parts 53A coupled by bolts, and then draws the first projections 61E out of the first through holes 53E. Accordingly, it is possible to easily detach the left and right first members 61 from the lower end portions of the left and right longitudinal members 53.

The left and right support parts 61C are set and attached to the left and right longitudinal members 53 such that the support parts 61C are inclined laterally outward of the vehicle body toward the lower end side of the support parts 61C.

Figure 12:
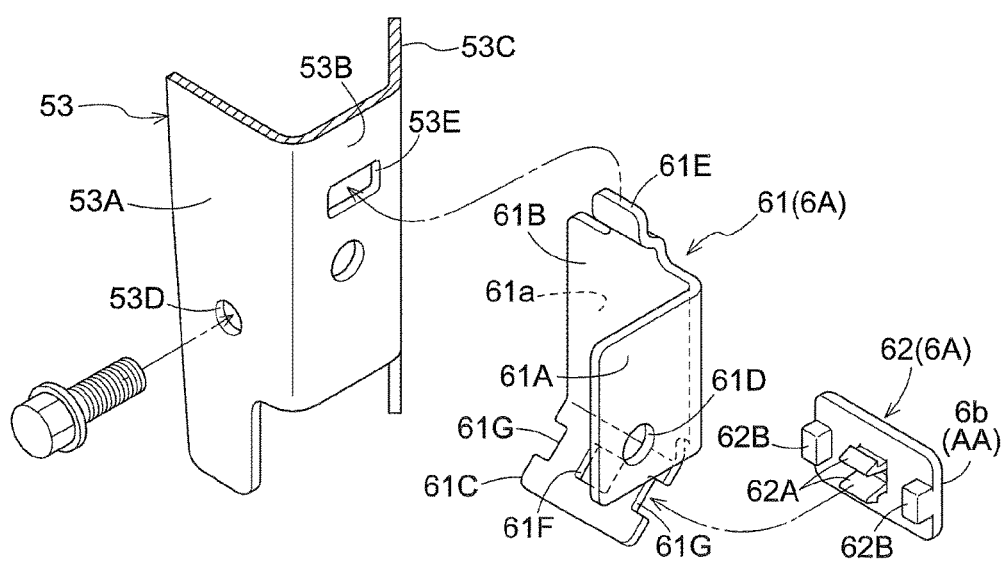
FIG. 12 shows the second example of the first embodiment, and is an enlarged exploded perspective view of the main part, illustrating configurations of the left and right longitudinal members and the left and right guide-target parts.
Figure 13:
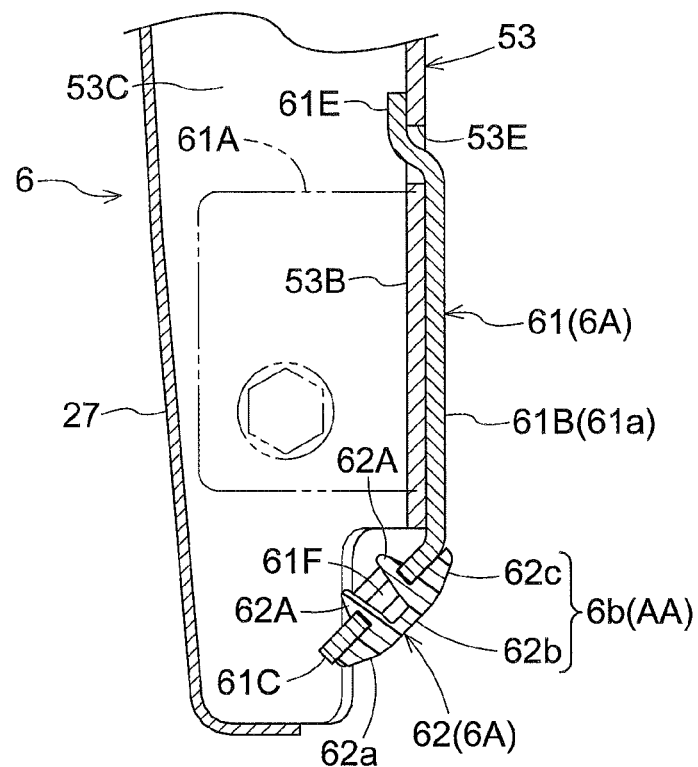
FIG. 13 shows the second example of the first embodiment, and is a longitudinal front view of the main part, illustrating configurations of the left and right longitudinal members and the left and right guide-target parts.

As shown in FIGS. 12 and 13, the left and right support parts 61C each have a third through hole 61F for engagement in the center thereof, and positioning recesses 61G at both front and rear ends. The left and right second members 62 each have, in the center thereof, upper and lower second projections 62A for engagement that are inserted into the third through hole 61F. The left and right second members 62 each have, at both front and rear ends thereof, third projections 62B for positioning that are fitted to the front and rear recesses 61G. The second projections 62A are elastic, and are hook-shaped.

With the above-described configuration, when attaching the left and right second members 62 to the left and right support parts 61C, the operator inserts the upper and lower second projections 62A into the third through holes 61F, and fits the front and rear third projections 62B to the front and rear recesses 61G. Accordingly, it is possible to easily attach the left and right second members 62 to the left and right support parts 61C in a predetermined posture.

Furthermore, when detaching the left and right second members 62 from the left and right support parts 61C, the operator draws the upper and lower second projections 62A out of the third through holes 61F while deforming the upper and lower second projections 62A toward the central part of the second members 62, and draws the front and rear third projections 62B out of the front and rear recesses 61G. Accordingly, it is possible to easily detach the left and right second members 62 from the left and right support parts 61C.

As shown in FIGS. 10 to 13, the left and right second side-wall parts 61B respectively have guide-target surfaces 61a that come into surface contact with the outer side surfaces of the left and right side walls 56, and are guided while sliding in the vertical direction, in the operations of opening and closing the bonnet 6 on the closed position side.

Accordingly, in the operation of closing the bonnet 6, when the centering of the bonnet 6 is complete as a result of the left and right guide-target parts 6A and the left and right guiding parts 13A coming into contact with each other, the left and right guide-target surfaces 61a are in surface contact with the outer side surfaces of the left and right side walls 56, and are guided while sliding to the closed position located downward. With the guiding by sliding down the bonnet 6, the bonnet 6 reaches the closed position located downward. When the bonnet 6 is at the closed position, the left and right guide-target surfaces 61a are maintained as being in surface contact with the outer side surfaces of the left and right side walls 56.

As a result, in the operation of opening and closing the bonnet 6 on the closed position side, and when the bonnet 6 is at the closed position, it is possible to reliably maintain the state in which the bonnet 6 is located in the center in the left-right direction of the vehicle body.

As shown in FIG. 13, the left and right second members 62 each are provided with, in an assembled state: a lower inclined surface 62a that has a large inclination angle; an intermediate inclined surface 62b that has an inclination angle smaller than that of the lower inclined surface 62a; and an upper inclined surface 62c that has an inclination angle smaller than that of the intermediate inclined surface 62b. The inclined surface 6b is constituted by the intermediate inclined surface 62b and the upper inclined surface 62c.

With the above-described configuration, in the operation of closing the bonnet 6, it is possible to smoothly shift from the centering of the bonnet 6 due to the left and right guide-target parts 6A and the left and right guiding parts 13A coming into contact with each other, to guiding by sliding down the bonnet 6 due to the left and right guide-target surfaces 61a coming into surface contact with the outer side surfaces of the left and right side walls 56.

Figure 10:
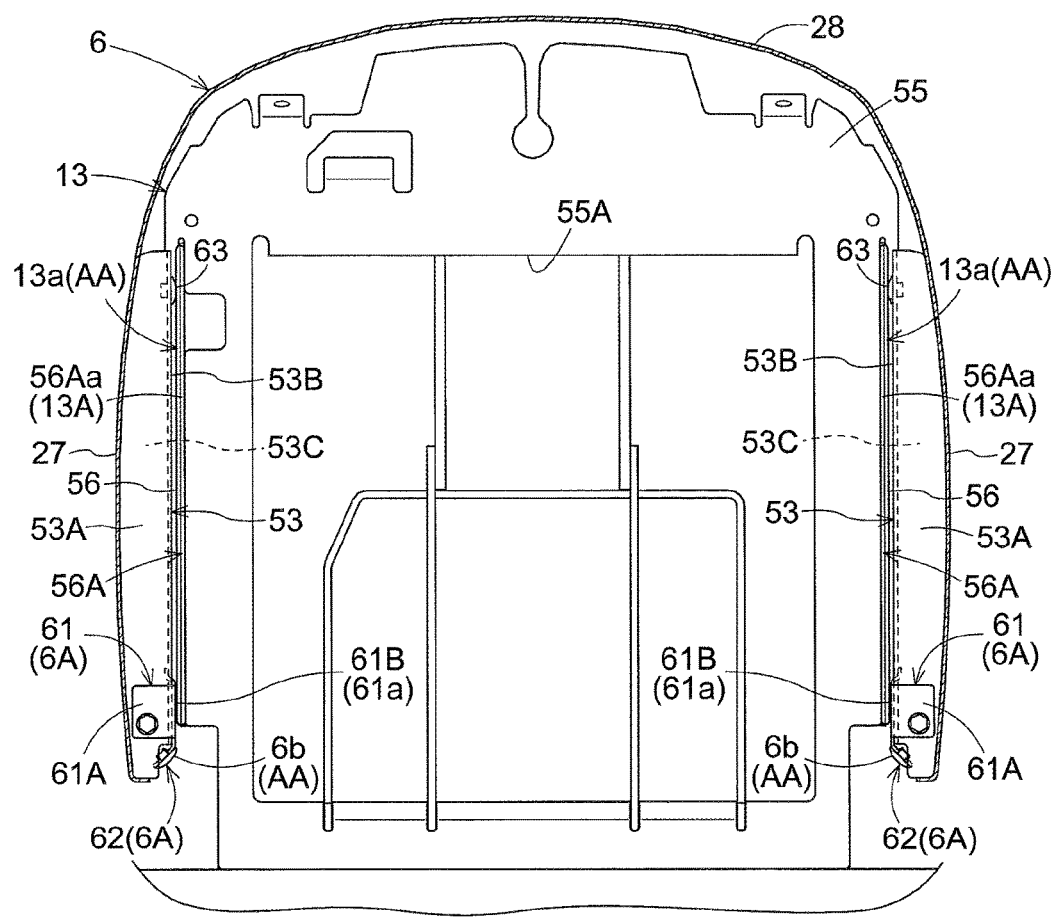
FIG. 10 shows a second example of the first embodiment, and is a longitudinal front view of the main part, illustrating a positional relationship between the left and right guiding parts and the left and right guide-target parts when the bonnet is located at the closed position.
Figure 11:
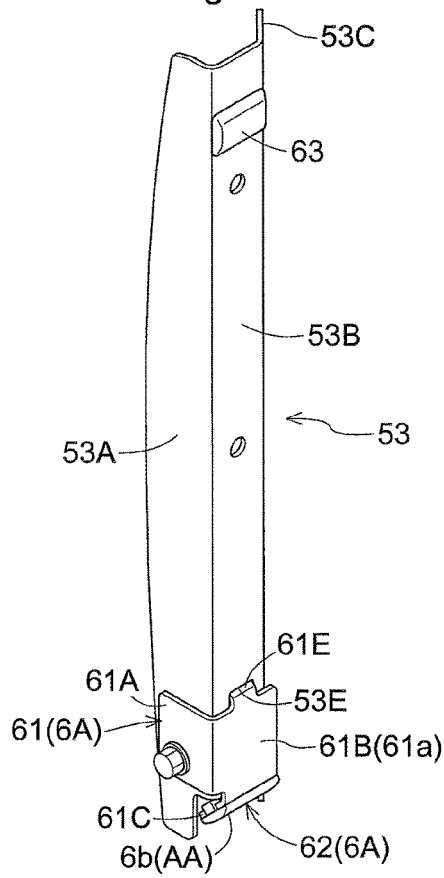

As shown in FIGS. 10 and 11, the left and right longitudinal members 53 are provided with, in the upper parts of the first side-wall parts 53B thereof, detachable stoppers 63 that are made of resin and come into contact with the outer side surfaces of the left and right side walls 56 when the bonnet 6 is at the closed position.

Accordingly, when the bonnet 6 is at the closed position, it is possible to prevent coating of the left and right first side-wall parts 53B from being removed by the left and right first side-wall parts 53B coming into contact with the center pillar 13 due to vibration of the machine or the like.

If the left and right stoppers 63 have worn for example, the operator can easily replace the worn stopper 63 with a new stopper 63.

Other Embodiments Modified from First Embodiment

The present invention is not limited to the configurations described as examples in the foregoing first embodiment. The following will describe other representative embodiments modified from the first embodiment.

1-1. The work vehicle may be a work vehicle in which the following configurations are employed.

For example, the work vehicle may be of a semi-crawler type in which, instead of the left and right rear wheels 5B, left and right crawlers are provided.

For example, the work vehicle may be of a full-crawler type in which, instead of the left and right front wheels 5A and the left and right rear wheels 5B, left and right crawlers are provided.

For example, the work vehicle may have a configuration in which the prime mover part 2 and the bonnet 6 are provided on the rear part side of the vehicle body frame 1.

For example, the work vehicle may have a configuration in which no front guard 7 is provided.

1-2. The configuration of the prime mover part 2 may have various modifications.

For example, the prime mover part 2 may have a configuration in which an air-cooled engine 15 is provided.

For example, the prime mover part 2 may be of an electrically-driven type in which, instead of the engine 15, an electric motor is provided.

For example, the prime mover part 2 may be of a hybrid type in which the engine 15 and an electric motor are provided.

For example, the prime mover part 2 may have a configuration in which an exhaust treatment device including a diesel particulate filter (DPF) is provided.

1-3. The configuration of the bonnet 6 may have various modifications.

For example, the bonnet 6 may be of a front-open type that widely opens, at its open position, the front part side of the prime mover part 2.

For example, the bonnet 6 may be configured to include, in the free end parts on the left and right inner side surfaces thereof, the left and right guide-target parts 6A that have a vertical length that spans the lower end portions of the free end parts and the intermediate parts in the vertical direction.

For example, the bonnet 6 may be configured to include, in the free end parts on the left and right inner side surfaces thereof, the left and right longitudinal members 53 that are substantially L-shaped in plan view and include the side-wall part 53B and the rear wall part 53C (guide-target parts 6A).

For example, the bonnet 6 may be configured to include, in the free end parts on the left and right inner side surface thereof, the left and right longitudinal members 53 that constitute the guide-target parts 6A and are made from steel strips.

1-4. The configuration and arrangement of the support frame 13 and the like may have various modifications.

For example, the support frame 13 is preferably arranged on the front end side of the vehicle body frame 1 if the bonnet 6 is configured to be of a front-open type and is arranged on the front part side of the vehicle body frame 1.

For example, the support frame 13 is preferably arranged on the rear end side of the vehicle body frame 1 if the bonnet 6 is configured to be of a rear-open type and is arranged on the rear part side of the vehicle body frame 1.

For example, the support frame 13 may be configured to include centering-dedicated left and right guiding members that respectively have the guiding parts 13A.

For example, the support frame 13 may be configured to include, for example: left and right first members that extend upward from the vehicle body frame 1; a second member that spans the upper end parts of the left and right first members; and the left and right side walls 56 that respectively include the left and right guiding parts 13A, and are coupled to the ends, on the laterally outer side, of the left and right first members.

For example, the support frame 13 may be configured to include, for example: left and right first members that respectively have the left and right guiding parts 13A, and extend upward from the vehicle body frame 1; and a second member that spans the upper end parts of the left and right first members.

1-5. The configuration of the left and right guide-target parts 6A may have various modifications.

For example, the left and right guide-target parts 6A may be resin parts that are detachably attached to the left and right inner side surfaces, on the lower part side, of the free end parts of the bonnet 6 with the inclined surfaces 6a (centering effective surfaces AA) inclined further laterally outward of the vehicle body toward the free end side of the bonnet 6.

For example, the left and right guide-target parts 6A may be resin parts that are detachably attached to the rear wall parts 53C of the left and right longitudinal members 53 with the inclined surfaces 6a (centering effective surfaces AA) that are inclined laterally outward of the vehicle body toward the free end side of the bonnet 6.

For example, the left and right guide-target parts 6A may be constituted only by the first members 61 described as an example in the second example. In this configuration, the surfaces of the support parts 61C of the first members 61 function as the inclined surfaces 6b (centering effective surfaces AA). Accordingly, each support part 61C of this configuration is not provided with the third through hole 61F for engagement and the recesses 61G for positioning.

For example, the left and right guide-target parts 6A may be fixed and mounted to the left and right inner side surfaces, on the lower part side, of the free end parts of the bonnet 6 with the inclined surfaces 6b (centering effective surfaces AA) that are inclined laterally outward of the vehicle body toward the lower end side of the bonnet 6.

Figure 14:
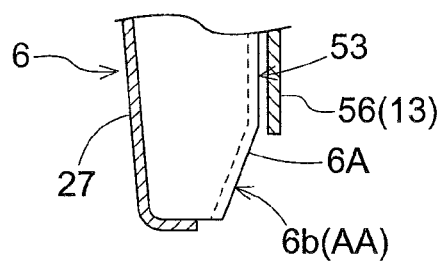
FIG. 14 shows another embodiment modified from the first embodiment, and is a longitudinal front view of the main part, illustrating an integration in which the left and right guide-target parts are integrated with the lower end portions of the left and right longitudinal members.

For example, as shown in FIG. 14, the left and right guide-target parts 6A may be integrally formed with the lower end parts of the side-wall parts 53B of the left and right longitudinal members 53 with the inclined surfaces 6b (centering effective surfaces AA) that are inclined laterally outward of the vehicle body toward the lower end side of the bonnet 6.

In this configuration, the bonnet 6 is provided with, in the free end parts on the left and right inner side surfaces thereof, the left and right longitudinal members 53 that have a vertical length that spans the lower end portion of the bonnet 6 and the upper end side thereof. The left and right longitudinal members 53 are close to and run along the outer side surfaces of the left and right side walls 56 of the center pillar (an example of the support frame) 13 when the bonnet 6 is at the closed position. The left and right longitudinal members 53 are provided with, in the lower end parts thereof, the left and right guide-target parts 6A. The left and right guide-target parts 6A are provided with, as the centering effective surfaces AA, the left and right inclined surfaces 6a that are inclined laterally outward of the vehicle body toward the lower end side of the bonnet 6.

In this configuration, in an operation in which the operator or the like closes the bonnet 6 from the open position to the closed position, if the bonnet 6 laterally swings with respect to the vehicle body frame 1, and the lower end parts of the left and right longitudinal members 53 provided in the free end part of the bonnet 6 reach the positions at the height at which the upper end side of the prime mover part 2 is located, the left and right guide-target parts 6A of the bonnet 6 come into contact with the left and right guiding parts 13A of the center pillar 13. This contact effects centering of the bonnet 6 with respect to the vehicle body frame 1.

As a result, in the operation of closing the bonnet 6, it is possible to avoid the risk of the bonnet 6 coming into contact with the engine 15 of the prime mover part 2 or the like due to a lateral swing of the bonnet 6 with respect to vehicle body frame 1.

Accordingly, when the bonnet 6 is located at the closed position, gaps that are formed between the left and right longitudinal members 53 of the bonnet 6 and the left and right side walls 56 of the center pillar 13 can be reduced uniformly in the vertical direction.

As a result, it is possible to effectively suppress the leakage of air with a raised temperature from the gaps between the left and right longitudinal members 53 of the bonnet 6 and left and right outer side surfaces of the center pillar 13.

1-6. The centering effective surface AA may be provided in only either the left and right guide-target parts 6A of the bonnet 6 or the left and right guiding parts 13A of the center pillar 13.

1-7. The left and right longitudinal members 53 or the left and right side walls 56 may be provided with a sealing member that is made of rubber, sponge, or the like, and fills up the gaps that are formed between the left and right longitudinal members 53 of the bonnet 6 and the left and right side walls 56 of the center pillar 13 when the bonnet 6 is at the closed position.

1-8. When the bonnet 6 is at the closed position, the left and right longitudinal members 53 of the bonnet 6 and the left and right side walls 56 of the center pillar 13 may come into surface contact with each other, or come into line contact with each other in the longitudinal direction, so that no gap is formed therebetween.

1-9. The guide-target parts 6A or the guide parts 13A may be soft members that are made of rubber, sponge, or the like so as to absorb the impact when the guide-target parts 6A come into contact with the guide parts 13A.

1-10. The left and right guiding parts 13A of the support frame 13 may be located at various positions at a height as long as they are at a height at which it is possible to avoid, in the operation of closing the bonnet 6, the risk of the bonnet 6 coming into contact with the engine 15 of the prime mover part 2 or the like due to a lateral swing of the bonnet 6 with respect to the vehicle body frame 1.

For example, the left and right guiding parts 13A may be located at the positions at the same height as the upper end part of the prime mover part 2, or at the positions at the height of the upper end side of the prime mover part 2, the upper end side being located in the vicinity of the intermediate part, in the vertical direction, of the prime mover part 2.

1-11. The work vehicle is not limited to a tractor, and may be a front loader, a mower, a rice-planting machine, or a wheel loader, for example.

Second Embodiment

The following describes, as an example of a mode for carrying out the present invention, a second embodiment in which the present invention is applied to a tractor that is an example of a work vehicle with reference to the drawings.

Figure 15:
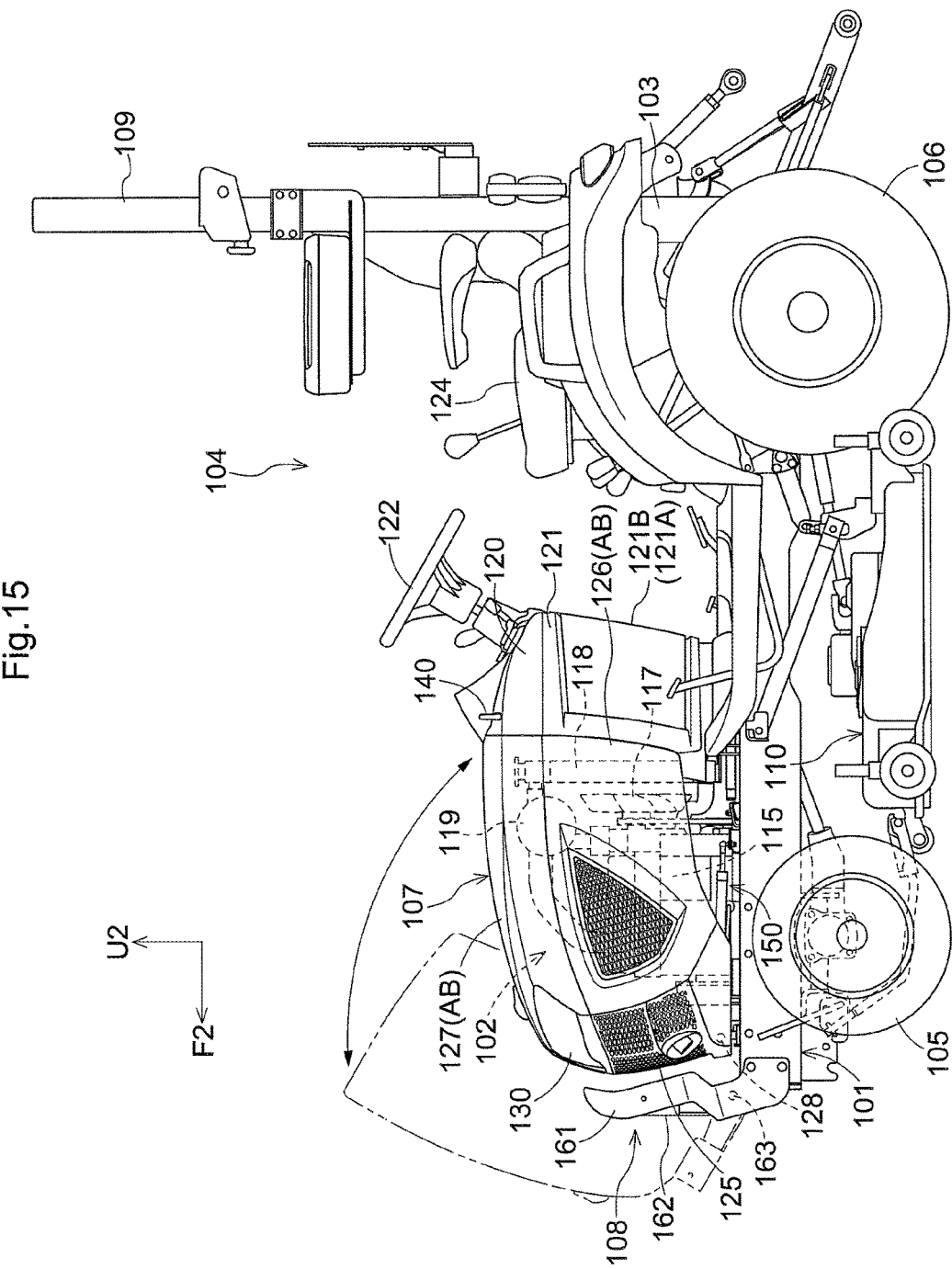
FIG. 15 shows a second embodiment, and is a left-side view of a tractor.

Note that the direction indicated by a sign F2 shown in FIG. 15 is the forward direction of the tractor, and the direction indicated by a sign U2 is the upward direction of the tractor.

Figure 16:
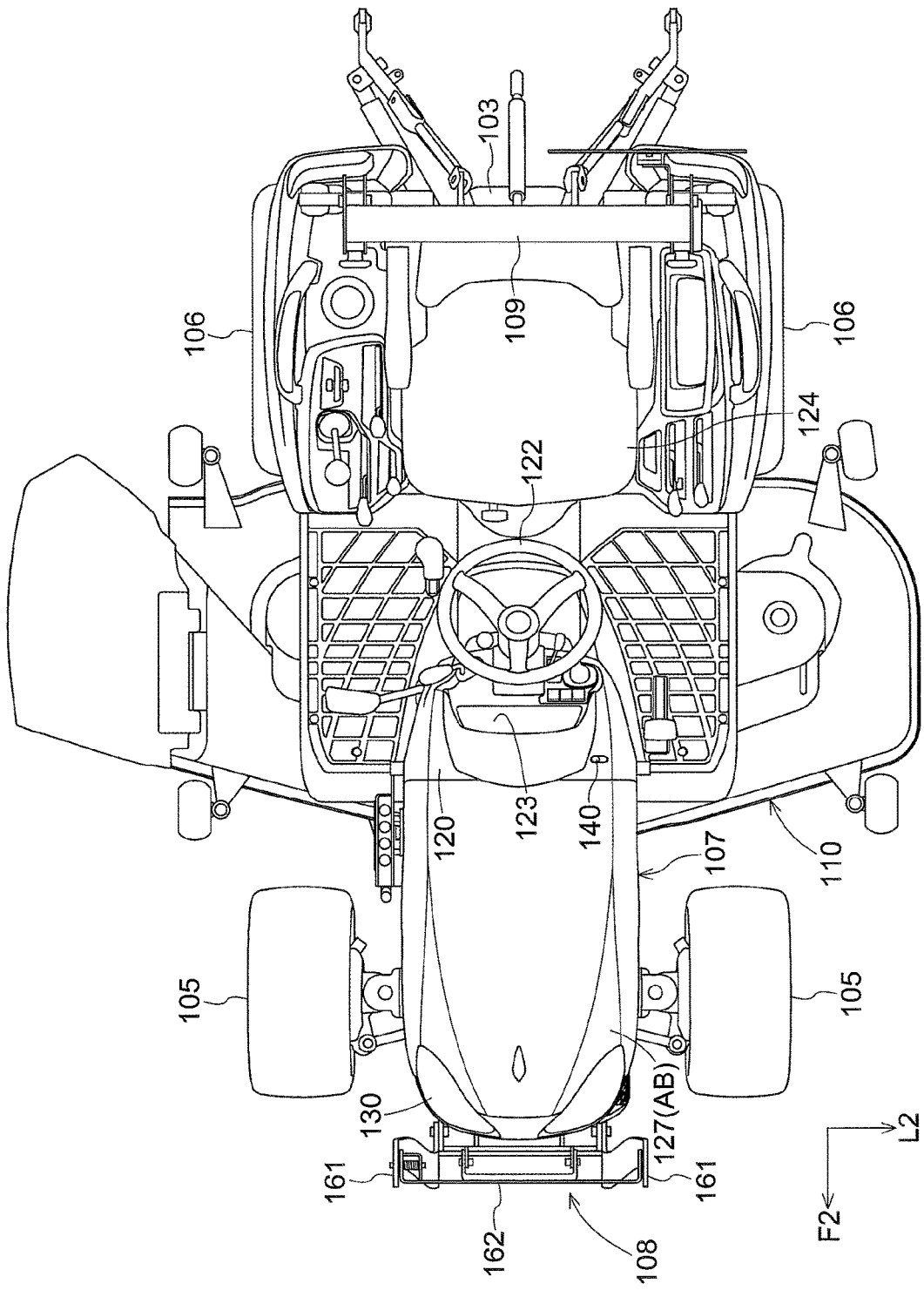
FIG. 16 shows the second embodiment, and is a plan view of the tractor.

The direction indicated by the sign F2 shown in FIG. 16 is the forward direction of the tractor, and the direction indicated by a sign L2 is the leftward direction of the tractor.

As shown in FIGS. 15 and 16, the tractor described in the present second embodiment as an example is provided with, for example: a vehicle body frame 101 that constitutes the framework of a vehicle body; a prime mover part 102 that is arranged on a front part side of the vehicle body frame 101; a transmission unit 103 that is coupled to a rear part of the vehicle body frame 101; a driving part 104 of a boarding type that is located above the rear part side of the upper part of the vehicle body frame 101; left and right front wheels 105 that are steerable and are driven by a driving force from the prime mover part 102; left and right rear wheels 106 that are steerable and are driven by a driving force from the prime mover part 102; a bonnet 107 that covers the prime mover part 102 and is configured to open and close by swinging; a front guard 108 that is made from a steel plate, and is located immediately in front of the bonnet 107 to protect the bonnet 107; a protection frame 109 that is coupled to the rear end part of the vehicle body frame 101; and a mower 110 that is arranged on an underbody between the left and right front wheels 105 and the left and right rear wheels 106.

As shown in FIGS. 17 to 19, and 24, the vehicle body frame 101 is provided with, for example: left and right side members 111 that are made from steel plates and are elongated in the front-rear direction; a front end member 112 that is made from a steel plate and spans the front ends of the left and right side members 111; a center pillar 113 that is coupled to central parts, in the front-rear direction, of the left and right side members 111; and left and right bonnet-coupling brackets 114 that are coupled to front end parts of the left and right side members 111.

Figure 17:
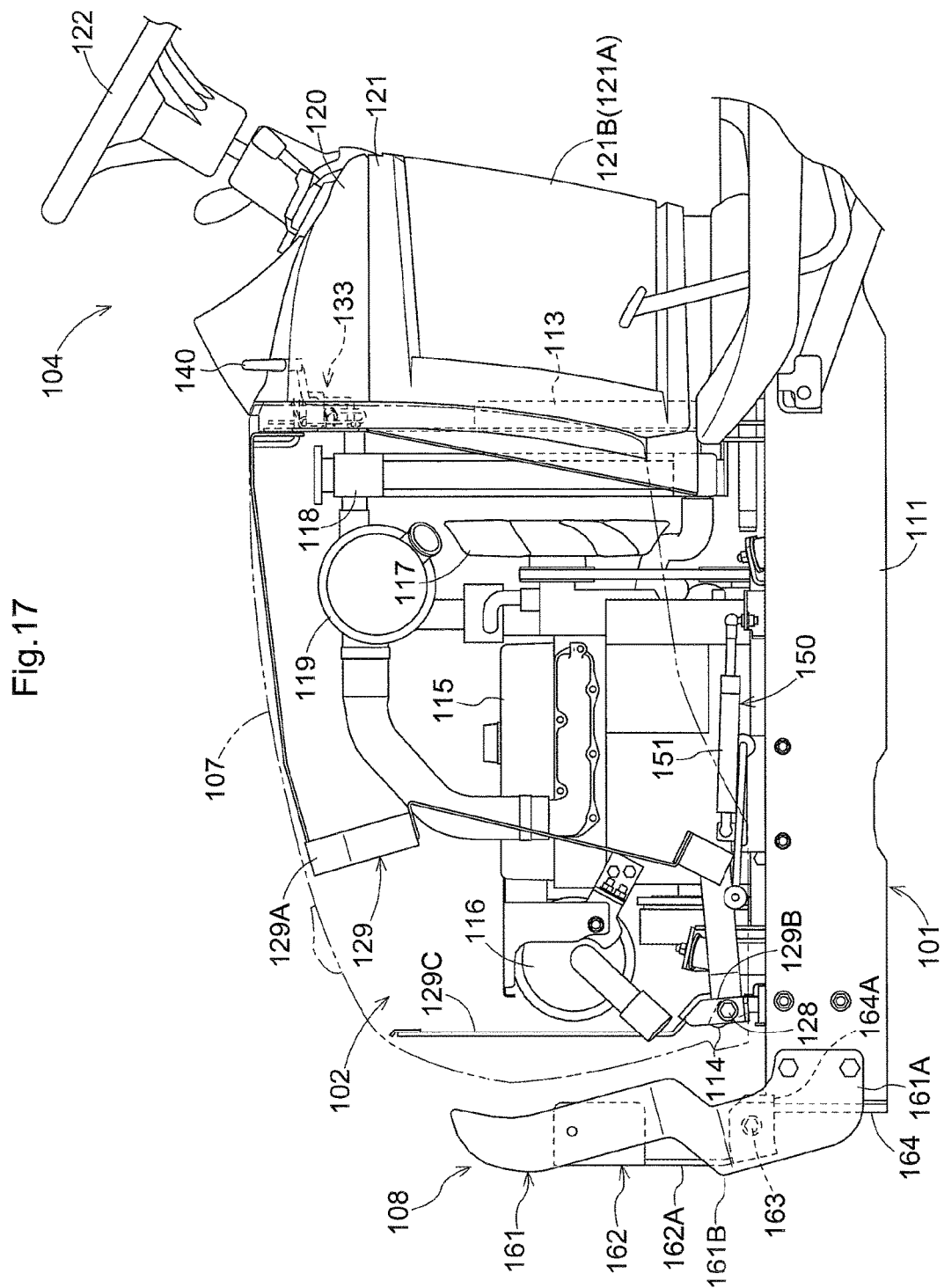
FIG. 17 shows the second embodiment, and is a left-side view of a main part, illustrating a state in which a bonnet is located at the closed position, and a second guard member of the front guard is located at a guard position.
Figure 18:
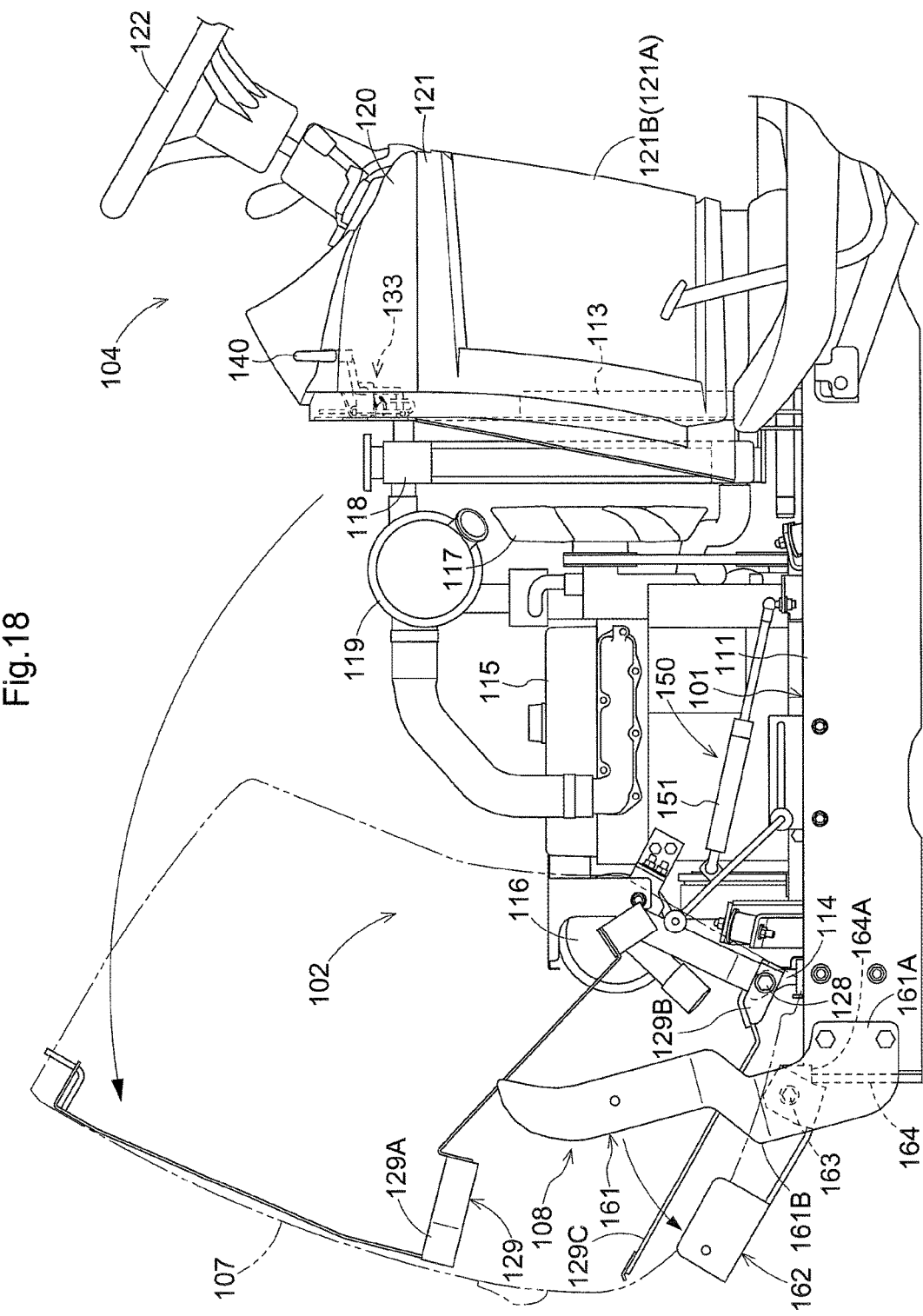
FIG. 18 shows the second embodiment, and is a left-side view of the main part, illustrating a state in which the bonnet is located at the open position, and the second guard member of the front guard is located at a retracted position.

As shown in FIGS. 15, 17, and 18, the prime mover part 102 is provided with, for example: a water-cooled type engine 115 that is supported by the front part of the vehicle body frame 101 so as to be vibration-proof; a muffler 116 that is arranged immediately in front of the engine 115 and is orientated in the left-right direction; a cooling fan 117 that is located immediately behind the engine 115; a radiator 118 that is arranged immediately behind the cooling fan 117; and an air cleaner 119 that is arranged above the engine 115.

As shown in FIGS. 15 to 18, the upper part side of a rear end part of the prime mover part 102 is covered by an upper panel 120, and the lower part side of the rear end part of the prime mover part 102 is covered by an under panel 121. The under panel 121 is provided with an air intake opening 121A, as well as a dust-proof screen 121B that covers the opening 121A.

The driving part 104 is provided with, for example: a steering wheel 122 for steering the front wheels; a display panel 123 that displays, for example, the number of revolutions of the engine; and an operation seat 124 that is arranged above the transmission unit 103.

As shown in FIGS. 15 to 20, the bonnet 107 is an integrated member in which, for example: a front cover 125 that covers the front end part of the prime mover part 102; left and right side covers 126 that serve as left and right sheet metal members AB covering the lateral side parts of the prime mover part 102; and an upper cover 127 that serves as a sheet metal member AB covering the upper part of the prime mover part 102, are integrally joined. The bonnet 107 opens and closes by swinging about first pivot shafts 128 that are located in the front end part of the vehicle body frame 101 and are orientated in the left-right direction.

Thus, the shape retainability of the bonnet 107 is improved. Furthermore, the bonnet 107 is of a rear-open type that widely opens the rear part side of the prime mover part 102 when located at the open position. As a result, it is easier to perform maintenance on the radiator 118 and the like that are arranged on the rear part side of the prime mover part 102.

Figure 19:
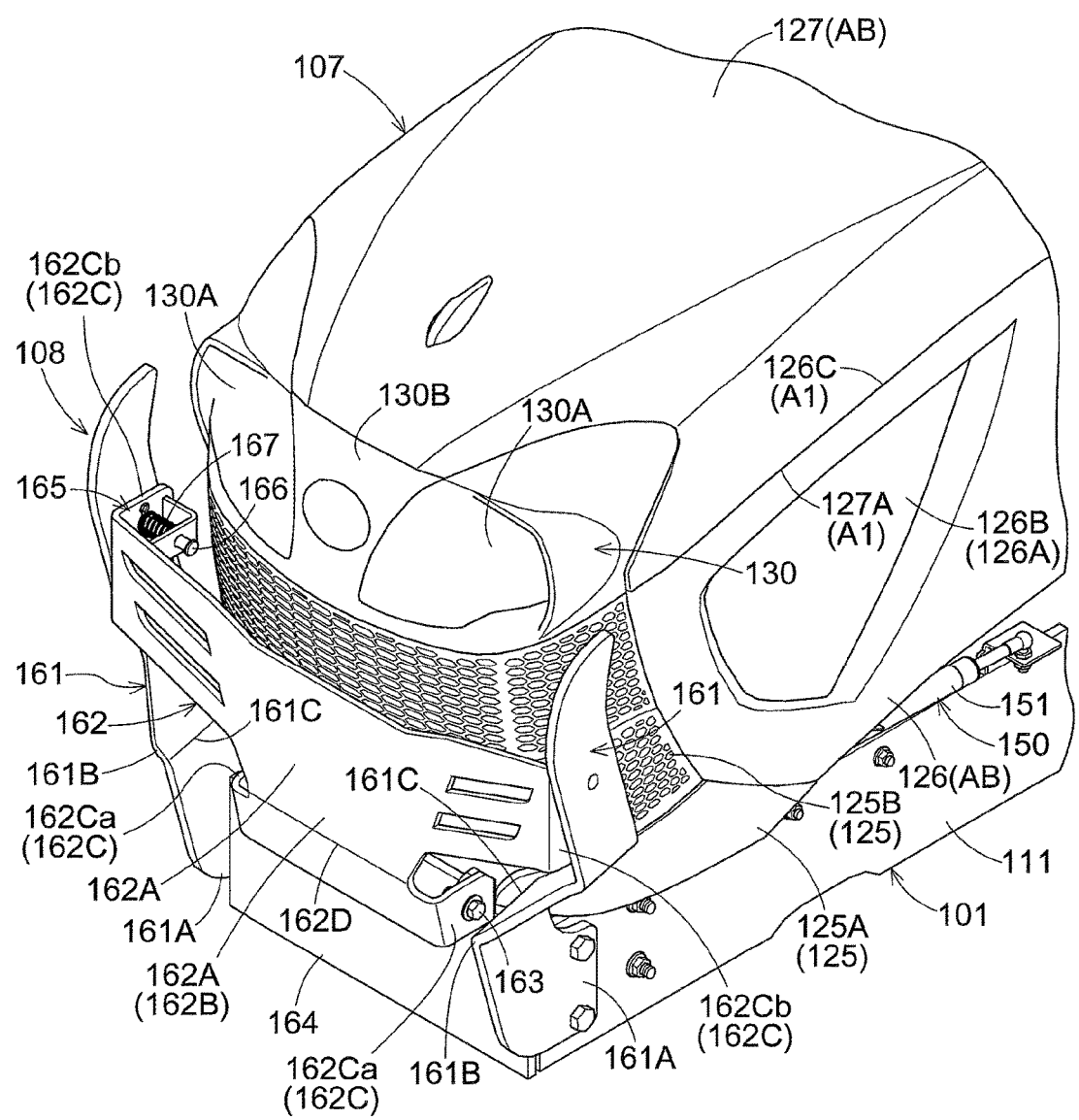
Figure 20:
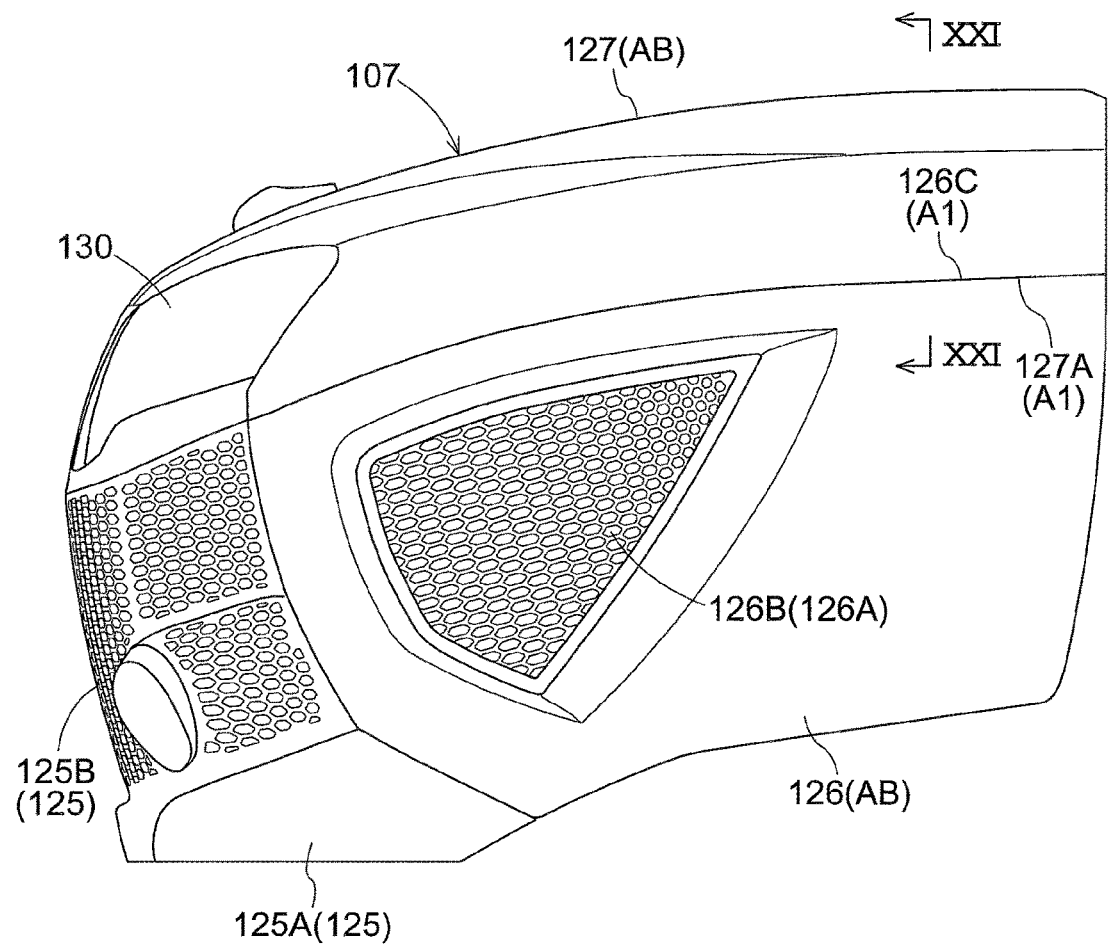
FIG. 20 shows the second embodiment, and is a left-side view of the bonnet.

As shown in FIGS. 15, 19, and 20, the front cover 125 is provided with, for example: a first member 125A that is U-shaped in plan view, and constitutes a lower end part of the front cover 125; and a second member 125B that serves as an exhaust for cooling air and constitutes the upper side of the front cover 125. A dust-proof screen is employed as the second member 125B. The left and right side covers 126 are each provided with an opening 126A through which cooling air is exhausted, and a dust-proof screen 126B that covers the opening 126A.

As shown in FIGS. 15 to 21, the bonnet 107 is provided with, for example: a bonnet frame 129 that is made from a steel plate and constitutes the framework of the bonnet 107; and a headlight 130 that is provided with left and right light parts 130A, and a frame part 130B.

The upper cover 127 is welded to an upper part 129A of the bonnet frame 129. Adjacent edges A1 of the left and right side covers 126 and the upper cover 127, namely, upper edges 126C of the left and right side covers 126 and left and right lower edges 127A of the upper cover 127, are welded to each other.

The lower end portion of the front end part of the bonnet frame 129 is provided with left and right first coupling parts 129B. The left and right first coupling parts 129B are coupled to the left and right brackets 114 of the vehicle body frame 101 with left and right bolts 128 that serve as the first pivot shafts 128 orientated in the left-right direction, and the like being interposed therebetween.

The bonnet frame 129 is provided with a second coupling part 129C in the central portion, in the left-right direction, of the front end part thereof. The front cover 125 is coupled to the lower part side of the second coupling part 129C, and the headlight 130 is coupled to the upper end part of the second coupling part 129C. Left and right ends of the front cover 125 are coupled to the front end parts of the left and right side covers 126. Left and right ends of the headlight 130 are coupled to the left and right front end parts of the upper cover 127.

Thus, the bonnet 107 is an integrated member into which the front cover 125, the left and right side covers 126, the upper cover 127, the bonnet frame 129, and the headlight 130 are integrated, and is configured to open and close by swinging about the left and right first pivot shafts 128 that are located in a lower end portion of a front end part of the bonnet 107, and are orientated in the left-right direction.

As shown in FIGS. 15 to 18, the bonnet 107 is fixed and held at the closed position by a lock mechanism 133. Although not shown, the lock mechanism 133 is constituted by, for example: a rod that is provided on the bonnet 107 and is orientated in the front-rear direction; a hook member that is provided on the center pillar 113 so as to be able to swing in the left-right direction; and a center pillar-side extension spring that biases the hook member such that the hook member returns to a lock position. The lock mechanism 133 fixes and holds the bonnet 107 at the closed position such that, in response to the operation of the bonnet 107 to swing toward the closed position, the hook member comes into contact with the rod and swings to retract toward the unlock position against the action of the extension spring, and then when the bonnet 107 reaches the closed position, the hook member returns to the lock position to catch on the rod due to the action of the extension spring.

The lock mechanism 133 is provided with an operation tool 140 that allows the hook member to be operated to swing to the unlock position against the action of the extension spring. The operation tool 140 protrudes upward from an opening (not shown) on a left end part of the upper panel 120.

In this way, the operation tool 140 for unlocking is located on the left end part of the upper panel 120, and therefore the operator can smoothly operate the operation tool 140 from the driving part 104 without being hindered by the steering wheel 122 located in the central part, in the left-right direction, of the upper panel 120.

As shows in FIGS. 15, and 17 to 19, this tractor is provided with an assist unit 150 that assists an operation to open the bonnet 107. The assist unit 150 is provided with, for example, a gas spring 151 that is biased to expand using a compression gas inside, and assists the operation to open the bonnet 107 using an extending motion and the like of this gas spring 151.

Thus, it is possible to easily open and close the heavy bonnet 107 into which the front cover 125, the left and right side covers 126, the upper cover 127, and the like are integrated, and that opens and closes by swinging.

Figure 24:
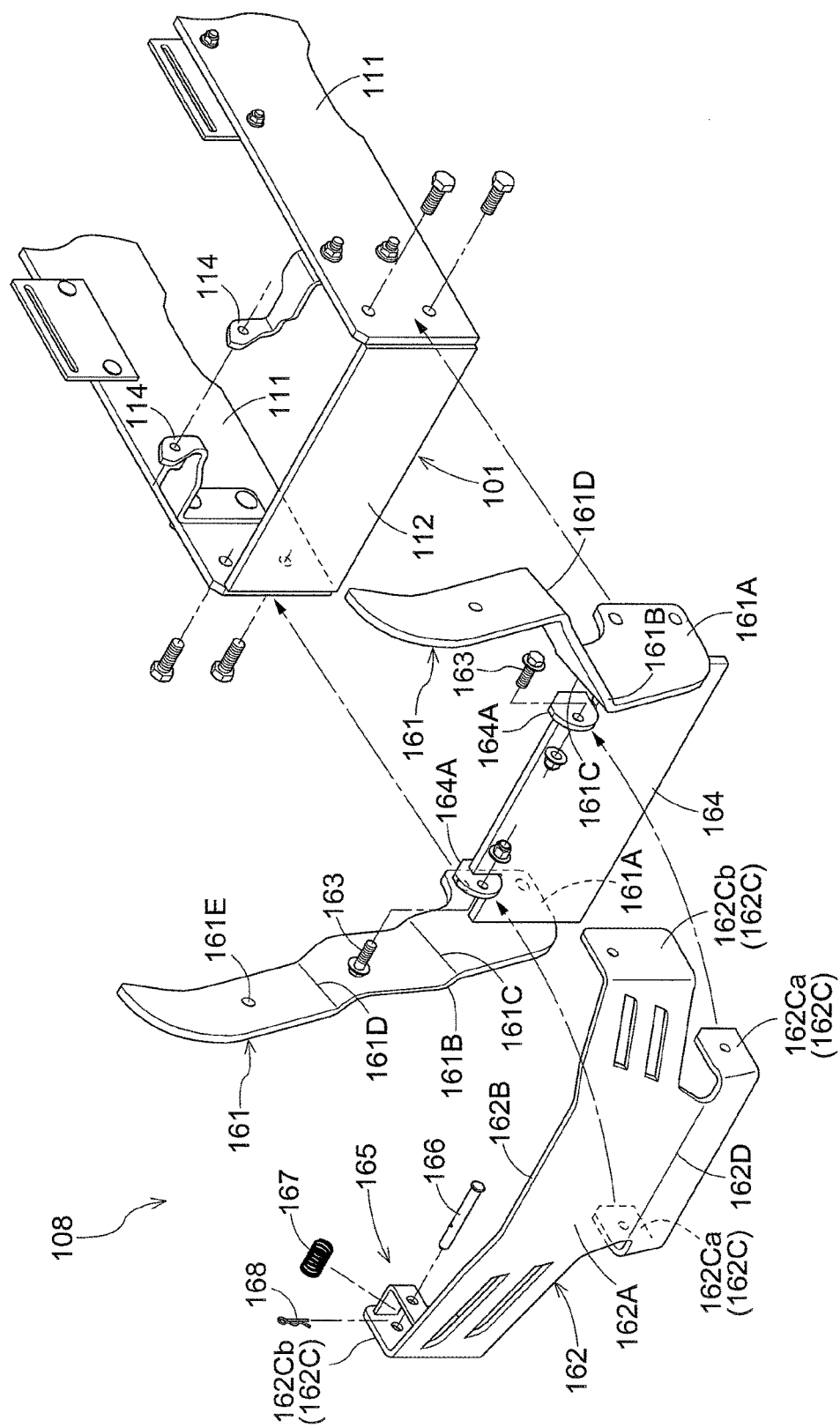
FIG. 24 shows the second embodiment, and is an exploded perspective view of the main part, illustrating a configuration of the front guard.

As shown in FIGS. 15, 19, and 24, the front guard 108 is provided with, for example: left and right first guard members 161 each having a lower end part 161A that is fixed and coupled to the vehicle body frame 101; and a second guard member 162 that is located between the left and right first guard members 161. The left and right first guard members 161 have a left-right distance therebetween that is larger than a left-right width of the bonnet 107, so that the bonnet 107 is allowed to be inserted into the space between the left and right first guard members 161. The second guard member 162 swings in the front-rear direction about second pivot shafts 163 that are located in the front end part of the vehicle body frame 101 and are orientated in the left-right direction, between a guard position at which the second guard member 162 is located immediately in front of the bonnet 107 at the closed position and a retracted position at which the second guard member 162 allows the bonnet 107 to swing to the open position. Front end parts 161B of the left and right first guard members 161 are located further forward of the vehicle body than a front end part 162A of the second guard member 162 located at the guard position is.

With this configuration, when performing maintenance on the prime mover part 102 or the like that is covered by the bonnet 107, the operator first operates the second guard member 162 so as to swing from the guard position to the retracted position, and then performs an operation to open the bonnet 107. Thus, it is possible to widely swing the bonnet 107 in the opening direction without being restricted by the front guard 108. Therefore, it is possible to widely open an area around the prime mover part 102 that is covered by the bonnet 107, and it is easier to perform maintenance on the prime mover part 102.

When the operator drives the tractor, the bonnet 107 is closed and the second guard member 162 is located at the guard position. Therefore, if the front guard 108 collides with another object, usually the front end parts 161B of the left and right first guard members 161, which are fixed and coupled to the vehicle body frame 101 and have a high supporting strength, collide with the other object. Therefore, it is possible to effectively prevent a problem in which the front guard 108 that has collided with another object comes into contact with the bonnet 107.

When the front guard 108 collides with another object, the object may enter the gap between the left and right first guard members 161. In such a case, the second guard member 162 collides with the other object and protects the bonnet 107.

As a result, it is possible to reliably protect the bonnet 107 by using the front guard 108 without degrading the maintainability of the prime mover part 102 and the like that are covered by the bonnet 107.

The front end parts 161B of the left and right first guard members 161 are located in the vicinity of the lower end parts 161A.

Therefore, in each of the left and right first guard members 161, a distance between the lower end part 161A that is fixed and coupled to the vehicle body frame 101, and the front end part 161B that collides with another object is small. It is thus possible to reduce the moment that acts on the left and right first guard members 161 when the front end parts 161B of the left and right first guard members 161 collide with another object.

As a result, it is possible to more effectively prevent a problem in which, when the front end parts 161B of the left and right first guard members 161 collide with another object, the left and right first guard members 161 are deformed and come into contact with the bonnet 107. It is thus possible to reliably protect the bonnet 107 by using the first guard members 161.

The left and right first guard members 161 are each provided with a lower-side first bent part 161C and an upper-side second bent part 161D that are bent along fold lines orientated in the front-rear direction. The left and right first guard members 161 are formed so as to have a left-right distance therebetween on the lower end portion side that is smaller than a left-right distance therebetween on the upper part side, so that the bonnet 107 is allowed to be inserted into a space between the left and right first guard members 161 on the upper part side, and the front end parts 161B of the first guard members 161 are formed in the first bent parts 161C.

With this configuration, it is possible to improve the strength of the front end parts 161B of the left and right first guard members 161. Also, if the front guard 108 collides with another object, it is possible to prevent the object from entering the space between the left and right first guard members 161.

As a result, it is possible to protect the bonnet 107 by using the left and right first guard members 161 more reliably and appropriately.

The front guard 108 is provided with a coupling member 164 that has a left-right width that spans the lower end parts of the left and right first guard members 161 and couples the lower end parts of the left and right first guard members 161 to each other. The coupling member 164 is joined to the front surface of the front end member 112 that constitutes the front end surface of the vehicle body frame 101.

With this configuration, it is possible to improve the strength and the shape retainability of the lower end parts 161A of the left and right first guard members 161. Also, when the front guard 108 collides with another object, it is possible to disperse the collision load over the front end surface of the vehicle body frame 101, and it is possible to prevent stress from concentrating at the position where the lower end parts 161A of the left and right first guard members 161 and the vehicle body frame 101 are coupled to each other.

As a result, it is possible to more reliably protect the bonnet 107 by using the left and right first guard members 161, while improving the durability of the front guard 108.

The second guard member 162 is U-shaped in plan view, and is provided with, for example: a longitudinal wall part 162B that faces the front face of the bonnet 107; and left and right extension parts 162C that extend rearward from the left and right ends of the longitudinal wall part 162B.

With this configuration, it is possible to improve the strength of the longitudinal wall part 162B of the second guard member 162. Also, if the front guard 108 collides with another object and the object enters the space between the left and right first guard members 161, the second guard member 162 having improved strength collides with the other object.

As a result, it is possible to effectively prevent a problem in which the second guard member 162 is deformed due to the collision with the other object and comes into contact with the bonnet 107, and it is possible to more reliably protect the bonnet 107 by using the second guard member 162.

As shown in FIGS. 17 to 19, and 24, the longitudinal wall part 162B has a bent part 162D that is bent along a fold line orientated in the left-right direction.

With this configuration, it is possible to improve the strength of the longitudinal wall part 162B of the second guard member 162, and if the front guard 108 collides with another object and the object enters the space between the left and right first guard members 161, the longitudinal wall part 162B having improved strength collides with the other object.

As a result, it is possible to effectively prevent a problem in which the second guard member 162 is deformed due to the collision with the other object and comes into contact with the bonnet 107, and it is possible to more reliably protect the bonnet 107 by using the second guard member 162.

As shown in FIGS. 15 to 19, and 24, the second guard member 162 is provided with, as the left and right extension parts 162C: left and right first extension parts 162Ca that are located on the side of a pivot at which the second guard member 162 swings, and left and right second extension parts 162Cb that are located on the free end side of the second guard member 162. The left and right first extension parts 162Ca are coupled to left and right coupling parts 164A provided on the coupling member 164 with the left and right bolts 163 that serve as the second pivot shafts 163 orientated in the left-right direction, and the like being interposed therebetween.

With this configuration, the second guard member 162 can be attached to and detached from the vehicle body frame 101 in association with the left and right first guard members 161 being attached to and detached from the vehicle body frame 101.

Also, it is possible to obtain frictional force between the left and right first extension parts 162Ca and the left and right coupling parts 164A that enable the second guard member 162 to be held at an arbitrary swing position, while allowing the second guard member 162 to be operated to swing.

As shown in FIGS. 17 and 18, when the second guard member 162 is at the guard position, the second guard member 162 is prevented from swinging from the guard position rearward the vehicle body due to the left and right first extension parts 162Ca coming into contact with the upper end of the coupling member 164. When the second guard member 162 is at the retracted position, the second guard member 162 is prevented from swinging forward of the vehicle body from the retracted position due to the left and right first extension parts 162Ca coming into contact with the front surface side of the coupling member 164. The coupling member 164 has a vertical height that is as high as the front end member 112 of the vehicle body frame 101.

With this configuration, if the second guard member 162 collides with another object, the collision load at this time is received at the upper end of the coupling member 164 having a great vertical height, and thus it is possible to prevent a problem in which the second guard member 162 swings to retract from the guard position due to the collision with the other object, and comes into contact with the bonnet 107.

As shown in FIGS. 16, 17, 19, and 24, the front guard 108 is provided with a coupling mechanism 165 that couples the second guard member 162 at the guard position to the first guard member 161 on the right side.

With this configuration, it is possible to improve the supporting strength of the second guard member 162 at the guard position. With this configuration, if the front guard 108 collides with another object and the object enters the space between the left and right first guard members 161, the second guard member 162 having an improved supporting strength collides with the other object.

As a result, it is possible to effectively prevent a problem in which the second guard member 162 swings rearward or is deformed due to the collision with the other object and comes into contact with the bonnet 107, and it is possible to more reliably protect the bonnet 107 by using the second guard member 162.

The coupling mechanism 165 is provided with, for example: a coupling pin 166 that is orientated in the left-right direction and is supported on the right side portion of a free end part of the second guard member 162 so as to be able to operate to protrude and retract in the left-right direction; a compression spring 167 that biases the coupling pin 166 such that the coupling pin 166 protrudes leftward, and a beta pin 168 that serves also as a spring receiver and restricts the coupling pin 166 from protruding. An upper part of the first guard member 161 on the right side is provided with a through hole 161E that allows the coupling pin 166 to be inserted therein.

When the second guard member 162 is at the guard position, a right end part of the coupling pin 166 of the coupling mechanism 165 protrudes rightward to the outside of the second guard member 162 due to the action of the compression spring 167, and is inserted into the through hole 161E of the first guard member 161. Thus, the second guard member 162 at the guard position is coupled to the first guard member 161 on the right side.

When the second guard member 162 is at the guard position, the coupling pin 166 of the coupling mechanism 165 is operated to retract leftward against the action of the compression spring 167, and the right end part of the coupling pin 166 is removed from the through hole 161E of the first guard member 161. Thus, the second guard member 162 at the guard position and the first guard member 161 on the right side are decoupled from each other.

In other words, the coupling mechanism 165 can easily switch the state of the second guard member 162 at the guard position between the coupled state in which the second guard member 162 is coupled to the first guard member 161 on the right side and a decoupled state in which the second guard member 162 is decoupled from the first guard member 161, by performing an operation to cause the coupling pin 166 to protrude or retract.

Figure 21:
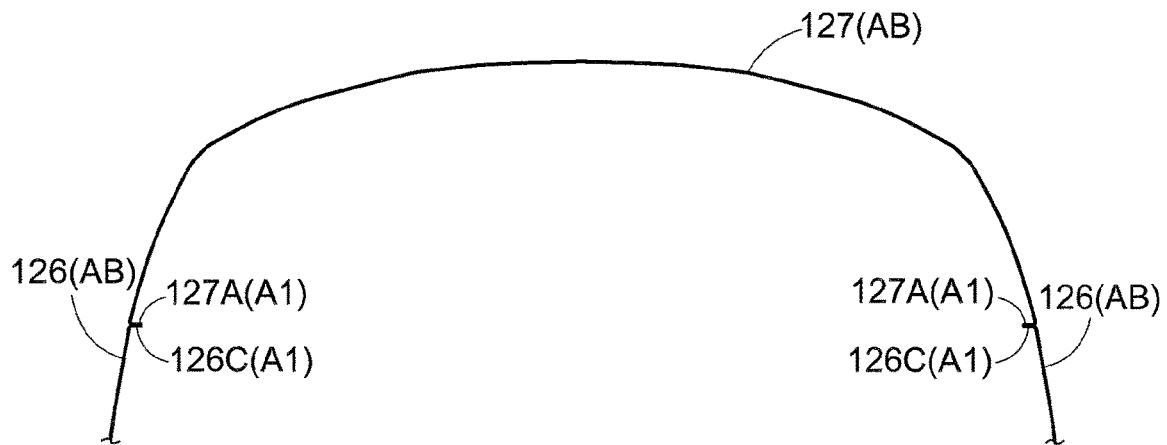
FIG. 21 shows the second embodiment, and is a cross-sectional view taken along a line XXI-XXI of FIG. 20, illustrating the shapes of upper edges of left and right side covers and the left and right lower edges of an upper cover that are adjacent to each other.
Figure 22:
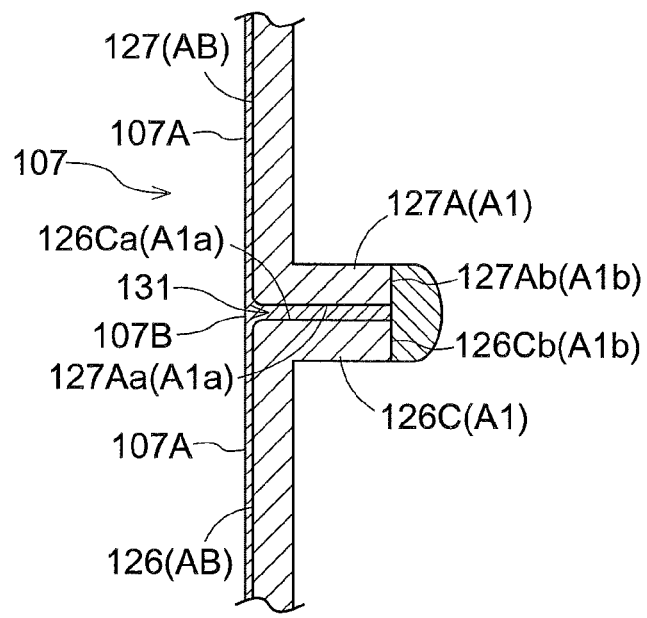
FIG. 22 shows the second embodiment, and is a longitudinal rear view of the main part, illustrating a state in which the upper edge of the side cover and the lower edge of the upper cover that are adjacent to each other are welded to each other.

As shown in FIGS. 21 and 22, the left and right side covers 126 and the upper cover 127 of the bonnet 107 extend toward the inside of the bonnet 107 such that the upper edges 126C of the left and right side covers 126 and the left and right lower edges 127A of the upper cover 127 that are adjacent to each other have adjacent surfaces A1a that face each other, namely, upper surfaces 126Ca or lower surfaces 127Aa. Extension ends A1b, namely, inner ends 126Cb of the left and right side covers 126 and inner ends 127Ab of the upper cover 127, are welded to each other in a state in which the upper edges 126C of the left and right side covers 126 and the left and right lower edges 127A of the upper cover 127, which are adjacent to each other, are arranged at a predetermined gap 131 between the upper surfaces 126Ca and the lower surfaces 127Aa that face each other.

Accordingly, the left and right side covers 126 and the upper cover 127 are such that, in a connected state in which the upper edges 126C and the lower edges 127A that are adjacent to each other are welded to each other, the predetermined gap 131 between the upper surfaces 126Ca and the lower surfaces 127Aa that face each other are ensured over the entire length of the upper edges 126C and the lower edges 127A that are adjacent to each other.

Thus, when the connected left and right side covers 126 and upper cover 127 are subjected to coating, a coating material spreads over the entirety of the surfaces of the side covers 126 and the upper cover 127, and enters the entire area of the gap 131 ensured between the upper surfaces 126Ca and the lower surfaces 127Aa that face each other.

As a result, no area between the upper edges 126C of the left and right side covers 126 and the left and right lower edges 127A of the upper cover 127 that are adjacent to each other remains uncoated with the coating material, and thus it is possible to prevent deterioration of the external appearance quality due to the area uncoated with the coating material rusting.

Figure 23:
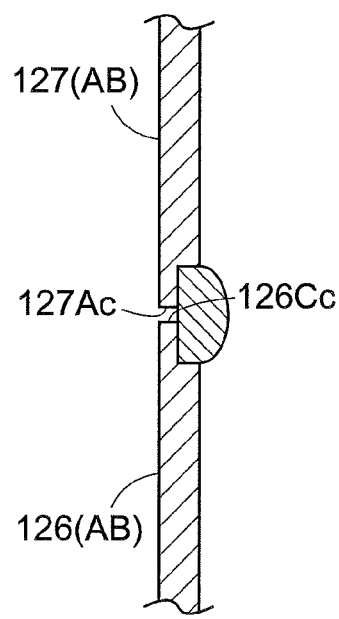
FIG. 23 shows the second embodiment, and is a longitudinal rear view of the main part of a comparative example, illustrating a state in which the upper edge of the side cover and the lower edge of the upper cover that are adjacent to each other are welded to each other.

Meanwhile, when connecting the left and right side covers 126 and the upper cover 127 of the bonnet 107 to each other, it is conceivable, as shown in FIG. 23 for example, to arrange the upper edges 126C of the left and right side covers 126 and the left and right lower edges 127A of the upper cover 127 that are adjacent to each other evenly so that edges 126Cc of the upper edges 126C face edges 127Ac of the lower edges 127A, and to weld the upper edges 126C to the lower edges 127A from the inside of the bonnet 107.

In this case, the connection positions of the side covers 126 and the upper cover 127 that are subjected to welding are flat, and thus there is a risk that it is difficult to view the positions that are being subjected to welding during a welding operation. Accordingly, there is still a demand for an improvement in the welding operation efficiency.

In contrast, in the bonnet 107 described in the second embodiment as an example, as shown in FIGS. 21 and 22, when connecting the left and right side covers 126 to the upper cover 127, the upper edges 126C of the left and right side covers 126 and the left and right lower edges 127A of the upper cover 127 that are adjacent to each other extend toward the inside of the bonnet 107, and the inner edges 126Cb of the upper edges 126C and the inner edges 127Ab of the lower edges 127A are welded to each other. Thus, it is easy to view the positions that are being subjected to welding during welding operation.

Furthermore, the welding for connecting the left and right side covers 126 and the upper cover 127 can be performed, on the inner edges 126Cb of the upper edges 126C and the inner edges 127Ab of the lower edges 127A that extend toward the inside of the bonnet 107, from the downstream side in the extending direction. Thus, it is easier to weld the upper edges 126C and the lower edges 127A that are adjacent to each other than the case where, for example, opposing positions of the upper edges 126C and the lower edges 127A that are adjacent to each other are sandwiched and welded to each other in the direction in which they are adjacent to each other.

As a result, it is possible to improve the operation efficiency in the welding operation to connect the left and right side covers 126 to the upper cover 127.

As shown in FIG. 22, the bonnet 107 has coated surfaces 107A and coated surfaces 107B that are even, the coated surfaces 107A being obtained by coating the surfaces of the left and right side covers 126 and the surface of the upper cover 127, and the coated surfaces 107B being obtained by coating the gap 131 between the upper edges 126C of the left and right side covers 126 and the left and right lower edges 127A of the upper cover 127 that are adjacent to each other.

With this configuration, when the left and right side covers 126 and the upper cover 127 that are connected to each other are subjected to coating, not only the coating material spreads over the entirety of the surfaces of the side covers 126 and upper cover 127, and enters the entire area of the gap 131 ensured between the upper surfaces 126Ca and the lower surfaces 127Aa that face each other, but also the coated surfaces 107A in the surface regions of the left and right side covers 126 and the upper cover 127, and the coated surfaces 107B in the gap region that is formed by the coating material inserted into and accumulated in the gap 131 between the upper surfaces 126Ca and the lower surfaces 127Aa that face each other become even.

As a result, the bonnet 107 can have an aesthetically pleasing external appearance in which there is no difference in level between the coated surfaces 107A in the surface regions of the left and right side covers 126 and the upper cover 127, and the coated surfaces 107B in the gap region between the left and right side covers 126 and upper cover 127 that are adjacent to each other.

Other Embodiments Modified from Second Embodiment

The present invention is not limited to the configurations described as an example in the foregoing second embodiment. The following will describe other representative embodiments modified from the second embodiment.

2-1. The work vehicle may have a configuration in which the prime mover part 102 and the bonnet 107 are provided in the rear part of the vehicle body frame 101.

2-2. The bonnet 107 may have a configuration in which the front cover 125 and the upper cover 127 are provided as sheet metal members AB, and their adjacent edges A1, namely, a rear end part of the front cover 125 and a front end part of the upper cover 127, extend toward the inside of the bonnet 107 so as to have adjacent surfaces A1a that face each other, and an extension end A1b of the rear end part and an extension end A1b of the front end part are welded to each other in a state in which the adjacent edges A1 are arranged at a predetermined gap 131 between the adjacent surface A1a of the rear end part and the adjacent surface A1a of the front end part.

2-3. The bonnet 107 may have a configuration in which the front cover 125, the left and right side covers 126, and the upper cover 127 are provided as sheet metal members AB, and their adjacent edges A1 extend toward the inside of the bonnet 107 so as to have adjacent surfaces A1a that face each other, and extension ends A1b of the adjacent edges A1 are welded to each other in a state in which the adjacent edges A1 are arranged at a predetermined gap 131 between the adjacent surfaces A1a.

2-4. The bonnet 107 may have a configuration in which left and right upper side covers and left and right lower side covers are provided as sheet metal members AB, and their adjacent edges A1, namely, lower end parts of the left and right upper side covers and upper end parts of the left and right lower side covers, extend toward the inside of the bonnet 107 so as to have adjacent surfaces A1a that face each other, and extension ends A1b of the lower end parts and extension ends A1b of the upper end parts are welded to each other in a state in which the adjacent edges A1 are arranged at a predetermined gap 131 between the adjacent surfaces A1*a* of the lower end parts and the adjacent surfaces A1*a* of the upper end parts.

2-5. The bonnet 107 may have a configuration in which the left and right upper side covers and the upper cover 127 are provided as sheet metal members AB, and their adjacent edges A1, namely, upper end parts of the upper side covers and a lower end part of the upper cover 127, extend toward the inside of the bonnet 107 so as to have adjacent surfaces A1*a* that face each other, and extension ends A1*b* of the upper end parts and an extension end A1*b* of the lower end part are welded to each other in a state in which the adjacent edges A1 are arranged at a predetermined gap 131 between the adjacent surface A1*a* of the upper end parts and the adjacent surface A1*a* of the lower end part.

2-6. The bonnet 107 may have a configuration in which a rear cover and the upper cover 127 are provided as sheet metal members AB, and their adjacent edges A1, namely, a front end part of the rear cover and the rear end part of the upper cover 127, extend toward the inside of the bonnet 107 so as to have adjacent surfaces A1*a* that face each other, and an extension end A1*b* of the front end part and an extension end A1*b* of the rear end part are welded to each other in a state in which the adjacent edges A1 are arranged at a predetermined gap 131 between the adjacent surface A1*a* of the front end part and the adjacent surface A1*a* of the rear end part.

2-7. The bonnet 107 may be configured by design to have a difference in level between the coated surfaces 107A obtained by coating the sheet metal members AB and the coated surface 107B obtained by coating a gap 131 between the sheet metal members.

2-8. The bonnet 107 may be of a front-open type that widely opens the front part side of the prime mover part 102 when located at the open position.

2-9. The work vehicle may have a configuration in which the first pivot shafts 128, which serve as the pivot of swing of the bonnet 107, serve also as the second pivot shafts 163, which serve as the pivot of swing of the second guard member 162.

2-10. The work vehicle may be provided with an association mechanism for associating opening and closing of the bonnet 107 by swinging with opening and closing of the second guard member 162 by swinging.

2-11. The bonnet 107 may have a configuration in which the front cover 125 and the upper cover 127 open and close by swinging about the first pivot shafts 128 that are orientated in the left-right direction, leaving the left and right side covers 126 at their respective positions.

2-12. The front guard 108 may have a configuration in which the left and right first guard members 161 are parallel to each other, and protrude upward from the vehicle body frame 101.

2-13. The front guard 108 may not necessarily be provided with the coupling member 164 that spans the lower end parts 161A of the left and right first guard members 161.

2-14. The front guard 108 may be provided with a coupling mechanism 165 that couples the second guard member 162 at the guard position to the first guard member 161 on the left side.

2-15. The front guard 108 may be provided with coupling mechanisms 165 that couples the second guard member 162 at the guard position to the left and right first guard members 161.

2-16. The front guard 108 may have a configuration in which the left and right first guard members 161 include, on the front edges thereof, receiving parts that are located further rearward of the vehicle body than the front end part 161B is and receive the second guard member 162 at the guard position, and the second guard member 162 has a left-right width larger than a left-right distance between the left and right first guard members 161, and has left and right end portions in which received parts that are received by the receiving parts of the left and right first guard members 161 are respectively formed.

2-17. The left and right first guard members 161 may extend upward from the vehicle body frame 101 such that the left-right distance therebetween increases toward the upper side.

2-18. The left and right first guard members 161 may respectively have the front end parts 161B that are located further forward of the vehicle body than the front end part 162A of the second guard member 162 is, and extend over the entire length of the first guard members 161 in the vertical direction.

2-19. The left and right first guard members 161 may respectively have, in the lower end parts 161A of the first guard members 161, the front end parts 161B that are located further forward of the vehicle body than the front end part 162A of the second guard member 162 is.

2-20. The left and right first guard members 161 may respectively have, in the free end parts away from the lower end parts 161A of the first guard members 161, the front end parts 161B that are located further forward of the vehicle body than the front end part 162A of the second guard member 162 is.

2-21. The left and right first guard members 161 may respectively have, in the adjacent parts of the first bent parts 161C of the first guard members 161, the front end parts 161B that are located further forward of the vehicle body than the front end part 162A of the second guard member 162 is.

2-22. The second guard member 162 may not necessarily have the bent part 162D in the longitudinal wall part 162B that faces the front surface of the bonnet 107.

2-23. The second guard member 162 may not necessarily have the left and right extension parts 162C that extend rearward from the left and right ends of the longitudinal wall part 162B.

2-24. The work vehicle may have a configuration in which no front guard 108 is provided.

2-25. The work vehicle is not limited to a tractor, and may be a mid-mount mower, a front mower, a mower, or a front loader, for example.

What is claimed is:

1. A work vehicle comprising:
   a vehicle body frame;
   a prime mover part that is supported by the vehicle body frame;
   a bonnet that is configured to vertically swing between a closed position at which the prime mover part is covered, and an open position at which the prime mover part is open; and
   a support frame that supports a free end side of the bonnet located at the closed position;
   wherein
   the bonnet is provided with, in free end parts of left and right inner side surfaces of the bonnet, left and right guide-target parts that are arranged in at least lower end portions of the free end parts,
   the support frame is provided with left and right guiding parts that are located at the same height as an upper end of the prime mover part, and are configured to come into contact with the left and right guide-target parts when the bonnet swings downward to the closed position, so as to enable the bonnet to be centered with respect to the vehicle body frame, and at least the left and right guide-target parts or the left and right guiding parts have left and right inclined surfaces that serve as centering effective surfaces.

2. The work vehicle according to claim 1, wherein the bonnet is provided with, in the free end parts of the left and right inner side surfaces of the bonnet, left and right longitudinal members that have a vertical length that spans the lower end portions of the bonnet and an upper end side of the bonnet, the left and right longitudinal members are close to and run along left and right outer side surfaces of the support frame when the bonnet is located at the closed position, and the left and right guide-target parts respectively have the inclined surfaces that are inclined laterally outward of the vehicle body toward the free end side of the bonnet, and are provided in free end parts of the left and right longitudinal members.

3. The work vehicle according to claim 2, wherein the left and right guide-target parts are detachably attached to the left and right longitudinal members.

4. The work vehicle according to claim 3, wherein the left and right guide-target parts are respectively provided with first members that are configured to be attached to and detached from the left and right longitudinal members, and second members that are configured to be attached to and detached from the first members, and the left and right second members are made of resin, and have the inclined surfaces.

5. The work vehicle according to claim 1, wherein the bonnet is provided with, in the free end parts of the left and right inner side surfaces of the bonnet, left and right longitudinal members that have a vertical length that spans the lower end portions of the bonnet and an upper end side of the bonnet, the left and right longitudinal members are close to and run along left and right outer side surfaces of the support frame when the bonnet is located at the closed position, and the left and right guide-target parts respectively have the inclined surfaces that are inclined laterally outward of the vehicle body toward a lower end side of the bonnet, and are provided in lower end parts of the left and right longitudinal members.

6. The work vehicle according to claim 5, wherein the left and right guide-target parts are detachably attached to the left and right longitudinal members.

7. The work vehicle according to claim 6, wherein the left and right guide-target parts are respectively provided with first members that are configured to be attached to and detached from the left and right longitudinal members, and second members that are configured to be attached to and detached from the first members, and the left and right second members are made of resin, and have the inclined surfaces.

8. A work vehicle comprising:

a bonnet including a plurality of sheet metal members that have adjacent edges that are welded to each other, wherein the plurality of sheet metal members extend toward the inside of the bonnet so that the adjacent edges have adjacent surfaces that face each other, and extension ends of the adjacent edges are welded to each other in a state in which the adjacent edges are arranged at a predetermined gap between the adjacent surfaces that face each other.

9. The work vehicle according to claim 8, wherein the bonnet has first coated surfaces that are obtained by coating surfaces of the sheet metal members, and a second coated surface that is obtained by coating the gap, the first coated surfaces and the second coated surface being formed flush with each other.

10. A work vehicle comprising:

a vehicle body frame;

a bonnet that is configured to open and close by swinging about a first pivot shaft that is located in a front end part of the vehicle body frame, and is orientated in a left-right direction; and a front guard that is located immediately in front of the bonnet, and protects the bonnet, wherein the front guard is provided with left and right first guard members whose lower end parts are fixed and coupled to the vehicle body frame, and a second guard member that is located between the left and right first guard members, the left and right first guard members have a left-right distance that is larger than a left-right width of the bonnet, and allow the bonnet to be inserted into a space between the left and right first guard members, the second guard member is configured to swing in a front-rear direction about a second pivot shaft that is located in the front end part of the vehicle body frame and is orientated in the left-right direction, between a guard position at which the second guard member is located immediately in front of the bonnet at the closed position, and a retracted position at which the second guard member allows the bonnet to swing to the open position, and front end parts of the left and right first guard members are located further forward of a vehicle body than a front end part of the second guard member located at the guard position is.

11. The work vehicle according to claim 10, wherein the front end parts of the left and right first guard members are located in the vicinity of the lower end parts.

12. The work vehicle according to claim 10, wherein the left and right first guard members each have a lower-side first bent part and an upper-side second bent part that are bent along fold lines that are orientated in the front-rear direction, the left and right first guard members are formed so as to have a left-right distance on a lower end part side that is smaller than a left-right distance on an upper part side allowing the bonnet to be inserted into a space between the left and right first guard members on the upper part side, and the left and right first guard members respectively have the front end parts that are formed in the first bent parts or portions adjacent to the first bent parts.

13. The work vehicle according to claim 10, wherein the front guard is provided with a coupling member that has a left-right width that spans the lower end parts of the left and right first guard members, and couples the lower end parts of the left and right first guard members, and the coupling member is joined to a front end surface of the vehicle body frame.

14. The work vehicle according to claim 10, wherein the front guard is provided with a coupling mechanism that couples the second guard member at the guard position to either or both of the left and right first guard members.

15. The work vehicle according to claim 10, wherein
the second guard member has a longitudinal wall part that faces a front face of the bonnet, and
the longitudinal wall part has a bent part that is bent along a fold line that is orientated in the left-right direction.

16. The work vehicle according to claim 10, wherein the second guard member is U-shaped when viewed in plan view, and includes a longitudinal wall part that faces a front face of the bonnet, and left and right extension parts that extend rearward from left and right ends of the longitudinal wall part.

\* \* \* \* \*